United States Patent
Hua et al.

(10) Patent No.: US 10,739,578 B2
(45) Date of Patent: Aug. 11, 2020

(54) HIGH-RESOLUTION FREEFORM EYEPIECE DESIGN WITH A LARGE EXIT PUPIL

(71) Applicant: Arizona Board of Regents on Behalf of the University of Arizona, Tucson, AZ (US)

(72) Inventors: Hong Hua, Tucson, AZ (US); Jason W Kuhn, Tucson, AZ (US)

(73) Assignee: THE ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 128 days.

(21) Appl. No.: 15/674,743

(22) Filed: Aug. 11, 2017

(65) Prior Publication Data

US 2018/0045949 A1    Feb. 15, 2018

Related U.S. Application Data

(60) Provisional application No. 62/374,207, filed on Aug. 12, 2016.

(51) Int. Cl.
| | |
|---|---|
| G02B 5/04 | (2006.01) |
| G02B 25/00 | (2006.01) |
| G02B 17/08 | (2006.01) |
| G02B 27/00 | (2006.01) |
| G02B 27/01 | (2006.01) |

(52) U.S. Cl.
CPC ............. *G02B 25/001* (2013.01); *G02B 5/04* (2013.01); *G02B 17/0856* (2013.01); *G02B 27/0081* (2013.01); *G02B 27/0172* (2013.01); G02B 2027/014 (2013.01); G02B 2027/0123 (2013.01)

(58) Field of Classification Search
CPC ...... G02B 5/04; G02B 25/001; G02B 17/086; G02B 27/0172
USPC ......................... 359/646, 647, 838, 834, 837
See application file for complete search history.

(56) References Cited

U.S. PATENT DOCUMENTS

| | | |
|---|---|---|
| 3,632,184 A | 1/1972 | King |
| 3,992,084 A | 11/1976 | Nakamura |
| 4,669,810 A | 6/1987 | Wood |
| 4,753,522 A | 6/1988 | Nishina |
| 4,863,251 A | 9/1989 | Herloski |
| 5,109,469 A | 4/1992 | Duggan |
| 5,172,272 A | 12/1992 | Aoki |
| 5,172,275 A | 12/1992 | Dejager |

(Continued)

FOREIGN PATENT DOCUMENTS

| | | |
|---|---|---|
| CN | 1252133 A | 5/2000 |
| CN | 101359089 A | 2/2009 |

(Continued)

OTHER PUBLICATIONS

US 9,213,186 B2, 12/2015, Cheng (withdrawn)

(Continued)

*Primary Examiner* — Darryl J Collins
(74) *Attorney, Agent, or Firm* — Niels Haun; Dann, Dorfman, Herrell & Skillman, P.C.

(57) ABSTRACT

Near-to-eye systems and head-mounted displays and more particularly but not exclusively to an optimized freeform wedge-shaped prism design having free-form surfaces efficiently mathematically represented and configured to provide both high resolution and a large exit pupil heretofore unachieved.

18 Claims, 15 Drawing Sheets

(56) References Cited

U.S. PATENT DOCUMENTS

| | | | |
|---|---|---|---|
| 5,436,763 A | 7/1995 | Chen | |
| 5,526,183 A | 6/1996 | Chen | |
| 5,572,229 A | 11/1996 | Fisher | |
| 5,621,572 A | 4/1997 | Fergason | |
| 5,625,495 A | 4/1997 | Moskovich | |
| 5,699,194 A | 12/1997 | Takahashi | |
| 5,701,202 A | 12/1997 | Takahashi | |
| 5,706,136 A | 1/1998 | Okuyama | |
| 5,818,632 A | 10/1998 | Stephenson | |
| 5,880,711 A | 3/1999 | Tamada | |
| 5,917,656 A | 6/1999 | Hayakawa | |
| 5,959,780 A | 9/1999 | Togino | |
| 6,008,781 A | 12/1999 | Furness | |
| 6,023,373 A | 2/2000 | Inoguchi | |
| 6,028,606 A | 2/2000 | Kolb | |
| 6,034,823 A | 3/2000 | Togino | |
| 6,198,577 B1 | 3/2001 | Kedar | |
| 6,201,646 B1 | 3/2001 | Togino | |
| 6,236,521 B1 | 5/2001 | Nanba | |
| 6,239,915 B1 | 5/2001 | Takagi | |
| 6,243,199 B1 | 6/2001 | Hansen | |
| 6,271,972 B1 | 8/2001 | Kedar | |
| 6,384,983 B1 | 5/2002 | Yamazaki | |
| 6,396,639 B1 | 5/2002 | Togino | |
| 6,404,561 B1 | 6/2002 | Isono | |
| 6,404,562 B1 | 6/2002 | Ota | |
| 6,433,376 B2 | 8/2002 | Kim | |
| 6,433,760 B1 | 8/2002 | Vaissie | |
| 6,493,146 B2 | 12/2002 | Inoguchi | |
| 6,510,006 B1 | 1/2003 | Togino | |
| 6,563,648 B2 | 5/2003 | Gleckman | |
| 6,646,811 B2 | 11/2003 | Inoguchi | |
| 6,653,989 B2 | 11/2003 | Nakanishi | |
| 6,671,099 B2 | 12/2003 | Nagata | |
| 6,731,434 B1 | 5/2004 | Hua | |
| 6,829,113 B2 | 12/2004 | Togino | |
| 6,963,454 B1 | 11/2005 | Martins | |
| 6,999,239 B1 | 2/2006 | Martins | |
| 7,152,977 B2 | 12/2006 | Ruda | |
| 7,177,083 B2 | 2/2007 | Holler | |
| 7,230,583 B2 | 6/2007 | Tidwell | |
| 7,249,853 B2 | 7/2007 | Weller-Brophy | |
| 7,405,881 B2 | 7/2008 | Shimizu | |
| 7,414,791 B2 | 8/2008 | Urakawa | |
| 7,522,344 B1 | 4/2009 | Curatu | |
| 8,467,133 B2 | 6/2013 | Miller | |
| 8,503,087 B1 | 8/2013 | Amirparviz | |
| 8,511,827 B2 | 8/2013 | Hua | |
| 9,239,453 B2 | 1/2016 | Cheng | |
| 9,310,591 B2 | 4/2016 | Hua | |
| 2001/0009478 A1 | 7/2001 | Yamazaki | |
| 2002/0015116 A1 | 2/2002 | Park | |
| 2002/0060850 A1 | 5/2002 | Takeyama | |
| 2002/0063913 A1 | 5/2002 | Nakamura | |
| 2003/0076591 A1 | 4/2003 | Ohmori | |
| 2003/0090753 A1 | 5/2003 | Takeyama | |
| 2004/0136097 A1 | 7/2004 | Park | |
| 2004/0164927 A1 | 8/2004 | Suyama | |
| 2004/0196213 A1 | 10/2004 | Tidwell | |
| 2004/0218243 A1 | 11/2004 | Yamazaki | |
| 2004/0233551 A1 | 11/2004 | Takahashi | |
| 2005/0036119 A1 | 2/2005 | Ruda | |
| 2005/0179868 A1 | 8/2005 | Seo | |
| 2005/0248849 A1 | 11/2005 | Urey | |
| 2006/0119951 A1 | 6/2006 | McGuire | |
| 2007/0109505 A1 | 5/2007 | Kubara | |
| 2008/0094720 A1 | 4/2008 | Yamazaki | |
| 2008/0291531 A1 | 11/2008 | Heimer | |
| 2009/0115842 A1 | 5/2009 | Saito | |
| 2009/0168010 A1 | 7/2009 | Vinogradov | |
| 2010/0109977 A1 | 5/2010 | Yamazaki | |
| 2010/0208372 A1 | 8/2010 | Heimer | |
| 2010/0271698 A1 | 10/2010 | Kessler | |
| 2010/0289970 A1 | 11/2010 | Watanabe | |
| 2011/0037951 A1 | 2/2011 | Hua | |
| 2011/0043644 A1 | 2/2011 | Munger | |
| 2011/0075257 A1 | 3/2011 | Hua | |
| 2011/0090389 A1 | 4/2011 | Saito | |
| 2011/0221656 A1 | 9/2011 | Haddick | |
| 2012/0013988 A1 | 1/2012 | Hutchin | |
| 2012/0019557 A1 | 1/2012 | Aronsson | |
| 2012/0050891 A1 | 3/2012 | Seidl | |
| 2012/0057129 A1 | 3/2012 | Durnell | |
| 2012/0081800 A1 | 4/2012 | Cheng | |
| 2012/0113092 A1 | 5/2012 | Bar-Zeev | |
| 2012/0160302 A1 | 6/2012 | Citron | |
| 2012/0162549 A1 | 6/2012 | Gao | |
| 2012/0242697 A1 | 9/2012 | Border | |
| 2012/0262802 A1* | 10/2012 | Huang | G02B 15/177 359/689 |
| 2013/0100524 A1 | 4/2013 | Magarill | |
| 2013/0112705 A1 | 5/2013 | McGill | |
| 2013/0187836 A1 | 7/2013 | Cheng | |
| 2013/0222896 A1 | 8/2013 | Komatsu | |
| 2013/0258461 A1 | 10/2013 | Sato | |
| 2013/0286053 A1 | 10/2013 | Fleck | |
| 2013/0300634 A1 | 11/2013 | White | |
| 2013/0329304 A1 | 12/2013 | Hua | |
| 2014/0009845 A1 | 1/2014 | Cheng | |
| 2014/0361957 A1 | 12/2014 | Hua | |
| 2015/0168802 A1 | 6/2015 | Bohn | |
| 2015/0201176 A1 | 7/2015 | Graziosi | |
| 2015/0208061 A1 | 7/2015 | Yang | |
| 2015/0212321 A1 | 7/2015 | Zhao | |
| 2015/0277129 A1 | 10/2015 | Hua | |
| 2016/0085075 A1 | 3/2016 | Cheng | |
| 2016/0239985 A1 | 8/2016 | Haddick et al. | |
| 2017/0078652 A1 | 3/2017 | Hua | |
| 2017/0102545 A1 | 4/2017 | Hua | |
| 2018/0045949 A1 | 2/2018 | Hua | |

FOREIGN PATENT DOCUMENTS

| | | |
|---|---|---|
| CN | 101424788 A | 5/2009 |
| EP | 0408344 | 1/1991 |
| EP | 1102105 | 5/2001 |
| JP | H03101709 | 4/1991 |
| JP | H09218375 A | 8/1997 |
| JP | H09297282 | 11/1997 |
| JP | H1013861 | 1/1998 |
| JP | H10307263 | 11/1998 |
| JP | H11326820 A | 11/1999 |
| JP | 2000249974 | 9/2000 |
| JP | 2001013446 | 1/2001 |
| JP | 2001066543 A | 3/2001 |
| JP | 2001145127 | 5/2001 |
| JP | 2001238229 | 8/2001 |
| JP | 2002148559 | 5/2002 |
| JP | 2003241100 | 8/2003 |
| JP | 2006091333 | 4/2006 |
| JP | 2006276884 A | 10/2006 |
| JP | 2007101930 | 4/2007 |
| JP | 2010072188 | 4/2010 |
| JP | 2014505381 | 2/2014 |
| WO | 9923647 | 5/1999 |
| WO | 2004079431 A1 | 9/2004 |
| WO | 2007002694 A2 | 1/2007 |
| WO | 2007085682 | 8/2007 |
| WO | 2007002694 A3 | 12/2007 |
| WO | 2007140273 A2 | 12/2007 |
| WO | 2008089417 A2 | 7/2008 |
| WO | 2011134169 | 11/2011 |
| WO | 2012064546 | 5/2012 |
| WO | 2012118573 | 9/2012 |
| WO | 2013112705 | 8/2013 |
| WO | 2014062912 | 4/2014 |
| WO | 2015134738 | 9/2015 |
| WO | 2015134740 | 9/2015 |
| WO | 2016033317 | 3/2016 |
| WO | 2018052590 | 3/2018 |

(56) References Cited

OTHER PUBLICATIONS

Dewen Cheng et al.; "Large field-of-view and high resolution free-form head-mounted display"; SPIE-OSA/ vol. 7652 Jun. 2018.
'Fresnel Lenses' downloaded from http://www.fresneltech.com on Jun. 8, 2011. Copyright Fresnel Technologies, Inc., 2003.
Azuma, R., et al., 'Recent advances in augmented reality', IEEE Computer Graphics App;. 21, 34-47 (2001).
Bajura, M., et al., "Merging virtual objects with the real world: seeing ultrasound imagery within the patient" in Proceedings of ACM Siggraph (ACM, Chicago, 1992), pp. 203-210.
Biocca, et al., "Virtual eyes can rearrange your body: adapting to visual displacement in see-through, head-mounted displays", Presence: Teleoperators and Virtual Environments 7, 262-277 (1998).
Bunkenburg, J. 'Innovative Diffractive Eyepiece for Helmet-Mounted Display.' SPIE vol. 3430. pp. 41-49 Jul. 1998.
C. Curatu, H. Hua, and J. P. Rolland, "Projection-based headmounted display with eye-tracking capabilities," Proc. SPIE 5875, 587050J (2005).
Cakmakci, O., et al., 'Head-Worn Displays: A Review'. Journal of Display Technology, vol. 2, No. 3, Sep. 2006, pp. 199-216.
Caudell, T., et al., "Augmented reality: an application of heads-up display technology to manual manufacturing processes" in Proceedings of Hawaii International Conferences on Systems Sciences (Hawaii, 1992), pp. 659-669.
Cruz-Neira et al., 'Surround-Screen Projection-Based Virtual Reality: the Design and Implementation of the CAVE,' Proceedings of the 20th Annual Conference on Computer Graphics and Interactive Techniques pp. 135-142, ACM Siggraph, ACM Press (1993).
Examination Report dated Apr. 29, 2011 from corresponding GB Application No. GB1012165.5.
H. Hua, C. Gao, and J. P. Rolland, 'Study of the Imaging properties of retroreflective materials used in head-mounted projective displays (HMPDs),' Proc. SPIE4711, 194-201 (2002).
H. Hua, C. Gao, F. Biocca, and J. P. Rolland, "An ultra-light and compact design and implementation of head-mounted projective displays," in Proceedings of IEEE VR 2001, pp. 175-182.
H. Hua, L. Brown, and C. Gao, "A new collaborative infrastructure: SCAPE," in Proceedings of IEEE VR 2003 (IEEE, 2003), pp. 171-179.
H. Hua, L. Brown, and C. Gao, "SCAPE: supporting stereoscopic collaboration in augmented and projective environments," IEEE Comput. Graphics Appl. 24, 66-75 (2004).
H. Hua, L. Brown, and C. Gao, "System and interface framework for SCAPE as a collaborative infrastructure," Presence: Teleoperators and Virtual Environments 13, 234-250 (2004).
H. Hua, Y. Ha, and J. P. Rolland, 'Design of an ultra-light and compact projection lens,' Appl. Opt. 42, 1-12 (2003), pp. 97-107.
H. Hua., A. Girardot, C. Gao. J. P. Rolland. 'Engineering of head-mounted projective displays'. Applied Optics. 39 (22), pp. 3814-3824. (2000).
H. Hua and C. Gao, "A polarized head-mounted projective display," in Proceedings of IEEE and ACM International Symposium on Mixed and Augmented Reality 2005 (IEEE, 2005), pp. 32-35.
Hua et al., 'Design of a Bright Polarized Head-Mounted Projection Display' Applied Optics 46:2600-2610 (2007).
International Search Report dated Mar. 9, 2009 with regard to International Patent Application No. PCT/ US2009/031606.
J. L. Pezzaniti and R. A. Chipman, "Angular dependence of polarizing beam-splitter cubes," Appl. Opt. 33, 1916-1929 (1994).
J. P. Rolland, F. Biocca, F. Hamza-Lup, Y. Ha, and R. Martins, "Development of head-mounted projection displays for distributed, collaborative, augmented reality applications," Presence: Teleoperators and Virtual Environments 14, 528-549 (2005).
J. P. Rolland and Hong Hua. "Head-mounted display systems," in Encyclopedia of Optical Engineering. R. Barry Johnson and Ronald O. Driggers, Eds, (2005).
Krueerke, Daniel, "Speed May Give Ferroelectric LCOS Edge in Projection Race," Display Devices Fall '05. Copyright 2005 Dempa Publications, Inc. pp. 29-31.
L. Brown and H. Hua, "Magic lenses for augmented virtual environments," IEEE Comput. Graphics Appl. 26, 64-73 (2006).
L. Davis, J. P. Rolland, F. Hamza-Lup, Y. Ha, J. Norfleet, and C. Imielinska, 'Enabling a continuum of virtual environment experiences,' IEEE Comput. Graphics Appl. 23, pp. 10-12 Mar./Apr. 2003.
M. Inami, N. Kawakami, and S. Tachi, 'Optical camouflage using retro-reflective projection technology,' in Proceedings of ISMAR 2003 {ISMAR, 2003).
M. Inami, N. Kawakami, D. Sekiguchi, Y. Yanagida, T. Maeda, and S. Tachi, "Visuo-haptic display using head-mounted projector," in Proceedings of IEEE Virtual Reality 2000, pp. 233-240.
M. Robinson. J. Chen, and G. Sharp, Polarization Engineering for LCD Projection. John Wiley & Sons, Ltd. England, 2005.
N. Kawakami, M. Inami, D. Sekiguchi, Y. Yangagida, T. Maeda, and S. Tachi, 'Object-oriented displays: a new type of display systemsfrom immersive display to object-oriented displays,' in Proceedings of IEEE SMC 1999, IEEE International Conference on Systems, Man, and Cybernetics, vol. 5, pp. 1066-1069.
R. Azuma, A Survey of Augmented Reality in Presence; Teleoperators and Virtual Environments 6. 4, 355-385, (1997).
R. Kijima, K. Haza, Y. Tada, and T. Ojika, "Distributed display approach using PHMD with infrared camera," in Proceedings of IEEE 2002 Virtual Reality Annual International Symposium (IEEE, 2002), pp. 1-8.
R. Kijima and T. Ojika, "Transition between virtual environment and workstation environment with projective headmounted display," in Proceedings of IEEE VR 1997 (IEEE, 1997), pp. 130-137.
R. Martins, V. Shaoulov, Y. Ha, and J. P. Rolland, "Projection based head-mounted displays for wearable computers," Proc. SPIE 5442, 104-110 (2004).
R. N. Berry, L. A. Riggs, and C. P. Duncan, "The relation of vernier and depth discriminations to field brightness," J. Exp. Psychol. 40, 349-354 (1950).
Rolland, J.P., et al., 'Optical versus video see-through head mounted displays in medical visualization', Presence' Teleoperators and Virtual Environments 9, 287-309 (2000).
Winterbottom, M., et al., 'Helmet-Mounted Displays for use in Air Force Training and Simulation', Human Effectiveness Directorate, Nov. 2005, pp. 1-54.
Written Opinion of the International Searching Authority dated Mar. 9, 2009 with regard to International Patent Application No. PCT/ US2009/031606.
Y. Ha, H. Hua, R. Martins, and J. P. Rolland, "Design of a wearable wide-angle projection color display," in Proceedings of International Optical Design Conference 2002 (IODC, 2002), pp. 67-73.
Zhang, R., "8.3: Design of a Compact Light Engine for FLCOS Microdisplays in a p-HMPD system", Society for Information Display 2008 International Symposium, Seminar and Exhibition (SID2008), Los Angeles, CA, May 2008.
Zhang, R., et al., "Design of a Polarized Head-Mounted Projection Display Using Ferroelectric Liquid-Crystal-on-Silicon Microdisplays", Applied Optics, vol. 47, No. 15, May 20, 2008, pp. 2888-2896.
Zhang, R., et al., "Design of a Polarized Head-Mounted Projection Display using FLCOS Microdisplays", Proc. of SPIE vol. 6489, 64890B-1. (2007).
"OLED-XL Microdisplays," eMagin 5 pages (2010).
A. Jones, I. McDowall, Yamada H., M. Bolas, P. Debevec, Rendering for an Interactive 360° Light Field Display ACM Transactions on Graphics (TOG)—Proceedings of ACM Siggraph 2007, 26(3), 2007.
A. Malmone, and H. Fuchs, "Computational augmented reality eyeglasses," Proc. of ISMAR 2012.
A. Castro, Y. Frauel, and B. Javidi, "Integral imaging with large depth of field using an asymmetric phase mask," Journal of Optics Express, vol. 15, Issue 16, pp. 10266-10273 (Aug. 2007).
A. T. Duchowski, "Incorporating the viewer's Point-Of-Regard (POR) in gaze-contingent virtual environments", SPIE—Int. Soc. Opt. Eng. Proceedings of SPIE—the International Society for Optical Engineering, vol. 3295, 1998, pp. 332-343.
Akeley et al., "A Stereo Display Prototype with Multiple Focal Distances," ACM Trans. Graphics 23:804-813 (2004).

(56) References Cited

OTHER PUBLICATIONS

Blundell, B. G., and Schwarz, A. J., "The classification of volumetric display systems: characteristics and predictability of the image space," IEEE Transaction on Visualization and Computer Graphics, 8(1), pp. 66-75, 2002.
C. B. Burckhardt, "Optimum parameters and resolution limitation of integral photography," J. Opt. Soc. Am. 58, 71-76 (1968).
C. Manh Do, R. Mart. ?nez-Cuenca, and B. Javidi, "Three-dimensional object-distortion-tolerant recognition for integral imaging using independent component analysis," Journal of Optical Society of America A 26, issue 2, pp. 245-251 (Feb. 1, 2009).
Chih-Wei Chen, Myungjin Cho, Yi-Pai Huang, and Bahram Javidi, "Improved viewing zones for projection type integral imaging 3D display using adaptive liquid crystal prism array," IEEE Journal of Display Technology, 2014.
Christopher M. Bishop, Neural Networks for Pattern Recognition, Oxford University Press, Inc. New York, NY 1995.
Curatu, C., J.P. Rolland, and Hong Hua, "Dual purpose lens for an eye-tracked projection head-mounted display," Proceedings of International Optical Design Conference, Vancouver, Canada, Jun. 2006.
D. Cheng, Y.Wang, H. Hua, and M. M. Talha, Design of an optical see-through headmounted display with a low f-number and large field of view using a free-form prism, App. Opt. 48 (14), pp. 2655-2668, 2009.
D. Cheng, Y. Wang, H. Hua, and M. M. Talha, "Design of an optical see-through head-mounted display with a low f-number and large field of view using a freeform prism," Appl. Opt., 48(14):2655-2668, 2009.
D. Cheng, Y. Wang, H. Hua, J. Sasian, "Design of a wide-angle, lightweight head-mounted display using free-form optics tiling," Opt. Lett., 36(11):2098-100, 2011.
D.M. Hoffman, A.R. Girshick, K. Akeley, and M.S. Banks, "Vergence-Accommodation Conflicts Hinder Visual Performance and Cause Visual Fatigue," J. Vision, 8(3), 1-30, (2008).
Davis et al., "Accommodation to Large Disparity Stereograms," Journal of AAPOS 6:377-384 (2002).
Downing et al., "A Three-Color, Solid-State, Three-Dimensional Display," Science 273:1185-1189 (1996).
Duchowski, A., "Eyetracking Methodology: theory and practice," Publisher: Springer, 2003.
Duchowski, A.T., and A. Coltekin, "Foveated gaze-contingent displays for peripheral LOD management, 3D visualization, and stereo imaging," ACM Trans. on Mult. Comp., Comm., and App. 3, 1-21, (2007).
Edgar et al., "Visual Accommodation Problems with Head-Up and Helmet-Mounted Displays?," Displays 15:68-75 (1994).
European Search Report dated Aug. 14, 2015 in corresponding EP application 13740989.2.
F. Okano, H. Hoshino, J. Arai y I. Yuyama, "Real-time pickup method for a three-dimensional image based on integral photography," Appl. Opt. 36, 1598-1603 (1997).
Favalora et al., "100 Million-Voxel Volumetric Display," Proc. SPIE 4712:300-312 (2002).
G. Lippmann, "Epreuves reversibles donnant la sensation du relief," Journal of Physics (Paris) 7, 821-825 (1908).
G. Wetzstein et al., "Tensor Displays: Compressive light field synthesis using multilayer displays with directional backlighting," ACM Transactions on Graphics, 31(4), 2012.
GB Examination Report corresponding to GB 1012165.5 dated Jun. 28, 2011.
Geisler, W.S., J.S. Perry and J. Najemnik, "Visual search: The role of peripheral information measured using gaze-contingent displays," J. Vision 6, 858-873 (2006).
Graham-Rowe, "Liquid Lenses Make a Splash," Nature-Photonics pp. 2-4 (2006).
H. Hua, X. Hu, and C. Gao, "A high-resolution optical see-through head-mounted display with eyetracking capability," Optics Express, Nov. 2013.
H. Hua, "Sunglass-like displays become a reality with freeform optical technology," SPIE Newsroom, 2012.

H. Mukawa, K. Akutsu, I. Matsumura, S. Nakano, T. Yoshida, M. Kuwahara, and K. Aiki, A full-color eyewear display using planar waveguides with reflection volume holograms, J. Soc. Inf. Display 19 (3), pp. 185-193, 2009.
H. Hoshi, N. Taniguchi, H. Morishima, T. Akiyama, S. Yamazaki and A. Okuyama, "Off-axial Hmd optical system consisting of aspherical surfaces without rotational symmetry," SPIE vol. 2653, 234 (1996).
H. Hua, C. Pansing, and J.P. Rolland, "Modeling of an eye-imaging system for optimizing illumination schemes in an eye-tracked head-mounted display," Appl. Opt., 46(31):7757-75, Oct. 2007.
H. Hua, P. Krishnaswamy, and J.P. Rolland, 'Video-based eyetracking methods and algorithms in head-mounted displays,' Opt. Express, 14(10):4328-50, May 2006.
Heanue et al., "Volume Holographic Storage and Retrieval of Digital Data," Science 265:749-752 (1994).
Hidenori Kuriyabashi, Munekazu Date, Shiro Suyama, Toyohiko HatadaJ. of the SID 14/5, 2006 pp. 493-498.
Hua, "Merging the Worlds of Atoms and Bits: Augmented Virtual Environments," Optics and Photonics News 17:26-33 (2006).
Hua, H., C. Pansing, and J. P. Rolland, "Modeling of an eye-imaging system for optimizing illumination schemes in an eye-tracked head-mounted display," Applied Optics, 46(32): 1-14, Nov. 2007.
Hua, H. "Integration of eye tracking capability into optical see-through head-mounted displays," Proceedings of SPIE (Electronic Imaging 2001), pp. 496-503, Jan. 2001.
Hua et al, "Compact eyetracked optical see-through head-mounted display", Proc. SPIE 8288, Stereoscopic Displays and Applications XXIII, 82881F (Feb. 9, 2012).
Inoue et al., "Accommodative Responses to Stereoscopic Three-Dimensional Display," Applied Optics, 36:4509-4515 (1997).
International Search Report and Written Opinion dated Nov. 24, 2015 in corresponding PCT application PCT/US2015/047163.
International Search Report dated Feb. 10, 2011 from PCT/CN2010/072376.
International Search Report dated Jan. 29, 2014 in corresponding international application PCT/US2013/065422.
International Search Report dated Jun. 18, 2010 in corresponding international application PCT/US2010/031799.
J. Hong, S. Min, and B. Lee, "Integral floating display systems for augmented reality," Applixed Optics, 51(18):4201-9, 2012.
J. S. Jang and B. Javidi, "Large depth-of-focus time-multiplexed three-dimensional integral imaging by use of lenslets with non-uniform focal lengths and aperture sizes," Opt. Lett. vol. 28, pp. 1924-1926 (2003).
J. Arai, et al., "Depth-control method for integral imaging," Feb. 1, 2008 / vol. 33, No. 3 / Optics Letters.
J. E. Melzer's: 'Overcoming the field-of-view/resolution invariant in head-mounted displays' Proc. SPIE vol. 3362, 1998, p. 284.
J. G. Droessler, D. J. Rotier, "Tilted cat helmet-mounted display," Opt. Eng., vol. 29, 849 (1990).
J. P. Rolland, "Wide-angle, off-axis, see-through head-mounted display," Opt. Eng., vol. 39, 1760 (2000).
J. S. Jang, F. Jin, and B. Javidi, "Three-dimensional integral imaging with large depth of focus by use of real and virtual image fields," Opt. Lett. 28:1421-23, 2003.
J. Y. Son, W.H. Son, S.K. Kim, K.H. Lee, B. Javidi, "Three-Dimensional Imaging for Creating Real-World-Like Environments," Proceedings of IEEE Journal, vol. 101, issue 1, pp. 190-205, Jan. 2013.
Jisoo Hong, et al., "Three-dimensional display technologies of recent interest: Principles, Status, and Issues," Applied Optics (Dec. 1, 2011) 50(34):106.
K. Iwamoto, K. Tanie, T. T. Maeda, "A head-mounted eye movement tracking display and its image display method", Systems & Computers in Japan, vol. 28, No. 7, Jun. 30, 1997, pp. 89-99. Publisher: Scripta Technica, USA.
K. Iwamoto, S. Katsumata, K. Tanie, "An eye movement tracking type head mounted display for virtual reality system:—evaluation experiments of a prototype system", Proceedings of 1994 IEEE International Conference on Systems, Man, and Cybernetics. Humans, Information and Technology (Cat. No. 94CH3571-5). IEEE. Part vol. 1, 1994, pp. 13-18 vol. 1. New York, NY, USA.

(56) References Cited

OTHER PUBLICATIONS

Kuiper et al., "Variable-Focus Liquid Lens for Miniature Cameras," Applied Physics Letters 85:1128-1130 (2004).
Kuribayashi, et al., "A Method for Reproducing Apparent Continuous Depth in a Stereoscopic Display Using "Depth-Fused 3D" Technology" Journal of the Society for Information Display 14:493-498 (2006).
L. G. Brown's: 'Applications of the Sensics panoramic HMD' SID Symposium Digest vol. 39, 2008, p. 77.
Laurence R. Young, David Sheena, "Survey of eye movement recording methods", Behavior Research Methods & Instrumentation, 7(5), 397-429, 1975.
Liu et al., 'A Novel Prototype for an Optical See-Through Head-Mounted Display with Addressable Focus Cues,' IEEE Transactions on Visualization and Computer Graphics 16:381-393 (2010).
Liu et al., "A Systematic Method for Designing Depth-Fused Multi-Focal Plane Three-Dimensional Displays," Optics Express 18:11562-11573 (2010).
Liu et al., "An Optical See-Through head Mounted Display with Addressable Focal Planes," IEEE Computer Society, pp. 33-42 (2008).
Liu et al., "Time-Multiplexed Dual-Focal Plane Head-Mounted Display with a Liquid Lens," Optics Letters 34:1642-1644 (2009).
Loschky, L.C. and Wolverton, G.S., "How late can you update gaze-contingent multiresolutional displays without detection?" ACM Trans. Mult. Comp. Comm. and App. 3, Nov. 2007.
Love et al. (High Speed switchable lens enables the development of a volumetric stereoscopic display. Aug. 2009, Optics Express. vol. 17, No. 18, pp. 15716-15725.).
M. Marti-nez-Corral, H. Navarro, R. Mart[ ?nez-Cuenca, G. Saavedra, and B. Javidi, "Full parallax 3-D TV with programmable display parameters," Opt. Phot. News 22, 50-50 (2011).
M. D. Missig and G. M. Morris, "Diffractive optics applied to eyepiece design," Appl. Opt. 34, 2452-2461 (1995).
M. Daneshpanah, B. Javidi, and E. Watson, "Three dimensional integral imaging with randomly distributed sensors," Journal of Optics Express, vol. 16, Issue 9, pp. 6368-6377, Apr. 21, 2008.
M. Gutin: 'Automated design and fabrication of ocular optics' Proc. SPIE 2008, p. 7060.
M. L. Thomas, W. P. Siegmund, S. E. Antos, and R. M. Robinson, "Fiber optic development for use on the fiber optic helmet-mounted display", Helmet-Mounted Displays, J. T. Carollo, ed., Proc. SPIE 116, 90-101, 1989.
M. Lucente, "Interactive three-dimensional holographic displays: seeing the future in depth," Computer Graphics, 31(2), pp. 63-67, 1997.
McQuaide et al., "A Retinal Scanning Display System That Produces Multiple Focal Planes with a Deformable Membrane Mirror," Displays 24:65-72 (2003).
Mon-Williams et al., "Binocular Vision in a Virtual World: Visual Deficits Following the Wearing of a Head-Mounted Display," Ophthalmic Physiol. Opt. 13:387-391 (1993).
O. Cakmakci, B. Moore, H. Foroosh, and J. P. Rolland, "Optimal local shape description for rotationally non-symmetric optical surface design and analysis," Opt. Express 16, 1583-1589 (2008).
Optical Research Associates, http://www.optica1res.com, 2 pages (obtained Jan. 26, 2011).
P. A. Blanche, et al, "Holographic three-dimensional telepresence using large-area photorefractive polymer", Nature, 468, 80-83, Nov. 2010.
P. Gabbur, H. Hua, and K. Barnard, 'A fast connected components labeling algorithm for real-time pupil detection,' Mach. Vision Appl., 21(5):779-787, 2010.
R. MartÃ?Å-nez-Cuenca, H. Navarro, G. Saavedra, B. Javidi, and M. MartÃ?Å-nez-Corral, "Enhanced viewing-angle integral imaging by multiple-axis telecentric relay system," Optics Express, vol. 15, Issue 24, pp. 16255-16260, Nov. 21, 2007.
R. Schulein, C. Do, and B. Javidi, "Distortion-tolerant 3D recognition of underwater objects using neural networks," Journal of Optical Society of America A, vol. 27, No. 3, pp. 461-468, Mar. 2010.
R. Schulein, M. DaneshPanah, and B. Javidi, "3D imaging with axially distributed sensing," Journal of Optics Letters, vol. 34, Issue 13, pp. 2012-2014, Jul. 1, 2009.
R.J. Jacob, "The use of eye movements in human-computer interaction techniques: what you look at is what you get", ACM Transactions on Information Systems, 9(2), 152-69, 1991.
Reingold, E.M., L.C. Loschky, G.W. McConkie and D.M. Stampe, "Gaze-contingent multiresolutional displays: An integrative review," Hum. Factors 45, 307-328 (2003).
Rolland, J. P., A. Yoshida, L. D. Davis and J. H. Reif, "High-resolution inset head-mounted display," Appl. Opt. 37, 4183-93 (1998).
Rolland et al., "Multifocal Planes Head-Mounted Displays," Applied Optics 39:3209-3215 (2000).
S. Bagheri and B. Javidi, "Extension of Depth of Field Using Amplitude and Phase Modulation of the Pupil Function," Journal of Optics Letters, vol. 33, No. 7, pp. 757-759, Apr. 1, 2008.
S. Hong, J. Jang, and B. Javidi,"Three-dimensional volumetric object reconstruction using computational integral imaging," Journal of Optics Express, on-line Journal of the Optical Society of America, vol. 12, No. 3, pp. 483-491, Feb. 9, 2004.
S. Hong and B. Javidi, "Distortion-tolerant 3D recognition of occluded objects using computational integral imaging," Journal of Optics Express, vol. 14, Issue 25, pp. 12085-12095, Dec. 11, 2006.
S. Kishk and B. Javidi, "Improved Resolution 3D Object Sensing and Recognition using time multiplexed Computational Integral Imaging," Optics Express, on-line Journal of the Optical Society of America, vol. 11, No. 26, pp. 3528-3541, Dec. 29, 2003.
Schowengerdt, B. T., and Seibel, E. J., "True 3-D scanned voxel displays using single or multiple light sources," Journal of SID, 14(2), pp. 135-143, 2006.
Schowengerdt et al., "True 3-D Scanned Voxel Displays Using Single or Multiple Light Sources," J. Soc. Info. Display 14:135-143 (2006).
Sheedy et al., "Performance and Comfort on Near-Eye Computer Displays," Optometry and Vision Science 79:306-312 (2002).
Shibata et al., "Stereoscopic 3-D Display with Optical Correction for the Reduction of the Discrepancy Between Accommodation and Convergence," Journal of the Society for Information Display 13:665-671 (2005).
Shiwa et al., "Proposal for a 3-D Display with Accommodative Compensation: 3DDAC," Journal of the Society for Information Display 4:255-261 (1996).
Sullivan, "A Solid-State Multi-Planar Volumetric Display," SID Symposium Digest of Technical Papers 34:354-356 (2003).
Suyama, S., Ohtsuka, S., Takada, H., Uehira, K., and Sakai, S., "Apparent 3D image perceived from luminance-modulated two 2D images displayed at different depths," Vision Research, 44: 785-793, 2004.
T. Okoshi, "Optimum design and depth resolution of lens-sheet and projection-type three-dimensional displays," Appl. Opt. 10, 2284-2291 (1971).
T. Ando, K. Yamasaki, M. Okamoto, and E. Shimizu, "Head Mounted Display using holographic optical element," Proc. SPIE, vol. 3293, 183 (1998).
Tibor Balogh, "The HoloVizio System," Proceedings of SPIE, vol. 6055, 2006.
Varioptic, "Video Auto Focus and Optical Image Stabilization," http://vvww.varioptic.com/en/home.html, 2 pages (2008).
Wann et al., Natural Problems for Stereoscopic Depth Perception in Virtual Environments, Vision Res. 35:2731-2736 (1995).
Wartenberg, Philipp, "EyeCatcher, the Bi-directional OLED Microdisplay," Proc. of SID 2011.
Watt et al., "Focus Cues Affect Perceived Depth," J Vision 5:834-862 (2005).
Written Opinion dated Feb. 10, 2011 from PCT/CN2010/072376.
Written Opinion dated Jun. 18, 2010 in corresponding international application PCT/US2010/031799.

(56) References Cited

OTHER PUBLICATIONS

X. Hu and H. Hua, "Design and assessment of a depth-fused multi-focal-plane display prototype," Journal of Display Technology, Dec. 2013.

Xiao Xiao, Bahram Javidi, Manuel Martinez-Corral, and Adrian Stern, "Advances in Three-Dimensional Integral Imaging: Sensing, Display, and Applications," Applied Optics, 52(4):. 546-560,2013.

Xin Shen, Yu-Jen Wang, Hung-Shan Chen, Xiao Xiao, Yi-Hsin Lin, and Bahram Javidi, "Extended depth-of-focus 3D micro integral imaging display using a bifocal liquid crystal lens," Optics Letters, vol. 40, issue 4, pp. 538-541 (Feb. 9, 2015).

Xinda Hu and Hong Hua, "High-resolution optical see-through multi-focal-plane head-mounted display using freeform optics," Optics Express,22(11): 13896-13903, Jun. 2014.

Y. Takaki, Y. Urano, S. Kashiwada, H. Ando, and K. Nakamura, "Super multi-view winshield display for long-distance image information presentation," Opt. Express, 19, 704-16, 2011.

Yamazaki et al, "Thin wide-field-of-view Hmd with free-form-surface prism and applications", Proc. SPIE 3639, Stereoscopic Displays and Virtual Reality Systems VI, 453 (May 24, 1999).

Yano, S., Emoto, M., Mitsuhashi, T., and Thwaites, H., "A study of visual fatigue and visual comfort for 3D HDTV/HDTV images," Displays, 23(4), pp. 191-201, 2002.

S. Feiner, 2002, "Augmented reality: A new way of seeing," Scientific American, No. 54, 2002.

K. Ukai and P.A. Howardth, "Visual fatigue caused by viewing stereoscopic motion images: background, theories, and observations," Displays, 29(2), pp. 106-116, 2008.

B. T. Schowengerdt, M. Murari, E. J. Seibel, "Volumetric display using scanned fiber array," SID Symposium Digest of Technical Papers, 2010.

H. Hua and B. Javidi, "A 3D integral imaging optical see-through head-mounted display", Optics Express, 22(11): 13484-13491, 2014.

W. Song, Y. Wang. D. Cheng, Y. Liu, "Light field head-mounted display with correct focus cue using micro structure array," Chinese Optics Letters, 12(6): 060010, 2014.

T. Peterka, R. Kooima, D. Sandin, A. Johnson, J. Leigh, T. DeFanti, "Advances in the Dynallax solid-state dynamic parallax barrier autostereoscopi visualization display system," IEEE Trans. Visua. Comp. Graphics, 14(3): 487-499, 2008.

Hu, X., Development of the Depth-Fused Multi-Focal Plane Display Technology, Ph.D. Dissertation, College of Optical Sciences, University of Arizona, 2014.

S. Ravikumar, K. Akeley, and M. S. Banks, "Creating effective focus cues in multi-plane 3D displays," Opt. Express 19, 20940-20952, 2011.

X. Hu and H. Hua, "Design and tolerance of a free-form optical system for an optical see-hrough multi-focal-plane display," Applied Optics, 54(33): 9990-9, 2015.

European Search Report dated Apr. 28, 2016 from EP application 13847218.8.

Xinda Hu et al: "48.1: Distinguished Student Paper: A Depth-Fused Multi-Focal-Plane Display Prototype Enabling Focus Cues in StereoscopicDisplays", SID International Symposium. Digest of Technical Papers, vol. 42, No. I, Jun. 1, 2011 (Jun. 1, 2011), pp. 691-694, XP055266326.

Hu and Hua, "Design and tolerance of a freeform optical system for an optical see-through multi-focal plane display," Applied Optics, 2015.

A. Yabe, "Representation of freeform surface suitable for optimization," Applied Optics, 2012.

Armitage, David, Ian Underwood, and Shin-Tson Wu. Introduction to Microdisplays. Chichester, England: Wiley, 2006.

Hoshi, et al, "Off-axial HMD optical system consisting of aspherical surfaces without rotational symmetry," Proc. SPIE 2653, Stereoscopic Displays and Virtual Reality Systems III, 234 (Apr. 10, 1996).

\* cited by examiner

HIGH-RESOLUTION FREEFORM EYEPIECE DESIGN WITH A LARGE EXIT PUPIL

RELATED APPLICATIONS

This is application claims the benefit of priority of U.S. Provisional Application No. 62/374,207, filed Aug. 12, 2016, the entire contents of which application(s) are incorporated herein by reference.

FIELD OF THE INVENTION

The present invention relates to near-to-eye systems and head-mounted displays and more particularly but not exclusively to an optimized freeform wedge-shaped prism design having free-form surfaces efficiently mathematically represented and configured to provide both high resolution and a large exit pupil heretofore unachieved.

BACKGROUND

Head-mounted displays (HMD) have found myriads of applications from scientific visualization to engineering applications, from medical to defense industries, and from information display to entertainment. A key component to an HMD system is an eyepiece optics that collects the light emitted by a microdisplay and forms a magnified, distant image of the digital information presented through the microdisplay for the eye to view. On the other hand, designing a wide field of view (FOV), compact, low F-number and nonintrusive HMD with a large exit pupil has been a great challenge. The typical eyepiece structure using rotationally symmetric components has limitations in achieving low F-number, large eye relief, and wide FOV.

Many methods have been explored to achieve an HMD optical system which fulfils the above mentioned requirements. These methods include applying catadioptric techniques, introducing new elements such as aspherical surfaces, holographic and diffractive optical components, exploring new design principles such as using projection optics to replace an eyepiece or microscope type lens system in a conventional HMD design, and introducing tilt and decenter or even freeform surfaces. (Morishima et al., "The design of off-axial optical system consisting of aspherical mirrors without rotational symmetry," 20th Optical Symposium, Extended Abstracts, 21, pp.53-56, 1995. H. Hoshi, et .al, "Off-axial HMD optical system consisting of aspherical surfaces without rotational symmetry," SPIE Vol. 2653, 234, 1996. S. Yamazaki, et al., "Thin wide-field-of-view HMD with freeform-surface prism and applications," Proc. SPIE, Vol. 3639, 453, 1999. Dewen Cheng et al, "Design of an optical see-through head-mounted display with a low f-number and large field of view using a freeform prism," Applied Optics, 2009. Dewen Cheng, et al. "Design of a wide-angle, lightweight head-mounted display using freeform optics tiling," Optics Letters, 2011. H. Hua, X. Hu, and C. Gao, "A high-resolution optical see-through head-mounted display with eyetracking capability," Optics Express, 2013.) Among the different methods mentioned above, freeform optical technology has demonstrated great promise in designing compact HMD systems. In particular, a wedge-shaped freeform prism takes advantage of total internal reflection (TIR), which helps minimize light loss and improve the brightness and contrast of the displayed images.

The concept of freeform HMD designs with a wedge-shaped prism was first presented by Morishima et al. in 1995, and the fabrication and evaluation method were explored by Inoguchi et al. ("Fabrication and evaluation of HMD optical system consisting of aspherical mirrors without rotation symmetry," *Japan Optics* '95, Extended Abstracts, 20pB06, pp. 19-20, 1995). Following these pioneering efforts, many attempts have been made to design HMDs using freeform surfaces, particularly designs based on a wedge-shaped prism (U.S. Pat. Nos. 5,699,194, 5,701,202, 5,706,136). For instance, Hoshi. et al. presented a freeform prism design offering an FOV of 34° and a thickness of 15 mm; Yamazaki et al. described a 51° optical see-through HMD (OST-HMD) design consisting of a freeform prism and an auxiliary lens attached to the prism; more recently Cheng et al demonstrated a 53° OST-HMD design with low F-number [U.S. Pat. No. 9,239,453 B2], and Hua et al presented the design of a high-resolution OST-HMD design integrated with eyetracking capability [Hua, Hu, and Gao, Optics Express, 21(25): 30993-30998, December 2013].

FIG. 1 shows a schematic layout of a typical freeform prism eyepiece design consisting of three optical surfaces, labeled as S1, S2, and S3. The prism eyepiece serves as the near-to-eye viewing optics that magnifies the image displayed through a microdisplay. For the sake of convenience, the surface adjacent to the exit pupil was labeled as S1 in the refraction path and as S1' in the reflection path. The center of the exit pupil was set as the origin of the global coordinate system and the rest of the surfaces were specified with respect to this global reference. The inventors further adopted the convention of tracing the system backward, namely from the eye position to the microdisplay. The overall system was set to be symmetric about the YOZ plane, but not the XOZ plane. In FIG. 1 the Z-axis is along the viewing direction, X-axis is parallel to the horizontal direction aligning with interpupilary direction, and the Y-axis is in the vertical direction aligning with the head orientation. A ray emitted from a point on the microdisplay is first refracted by the surface S3 next to the microdisplay. After two consecutive reflections by the surfaces S1' and S2, the ray is transmitted through the surface S1 and reaches the exit pupil of the system. To enable optical see-through capability, an auxiliary lens may be cemented to the wedge-shaped prism-lens in order to minimize the ray shift and distortion introduced to the rays from a real-world scene when the auxiliary freeform lens is combined with the prism-lens.

Most of the existing wedge-prism-based eyepiece designs have several limitations. First of all, the exit pupil diameter (EPD) of most existing designs is typically from 4 to 8 mm, which essentially results in a limited eyebox size. The eyebox defines a 3D volume in which the pupil of a viewer is placed to see the entire field of view of the display without losing imagery. A larger eyebox is preferred for HMD systems to facilitate ease of use and comfort. Secondly, in most of the existing designs, the size of the microdisplays is relatively large, in the range of 0.8 to 1.3 inches, which affords a relatively large focal length or low optical power to achieve a typical 40-degree FOV. Even with an exit pupil of 8 mm, the system F/# remains fairly high (greater than 3) and eases the optical design challenge. A large size microdisplay, however, offsets the advantage the compactness of using a freeform prism. In the more recent design by Cheng et al (AO 2009), smaller microdisplays, typically around 0.6", were adopted to achieve a 53-degree FOV, which requires a focal length of ~15 mm. The substantially reduced focal length makes it very challenging to design a system with a large exit pupil and long eye clearance distance. As a result, the conventional design compromises the size of non-vignetted exit pupil diameter (about 6 mm) by allowing a significant amount of vignetting for large field positions, which compromises the effective eyebox size to about 8 mm at the designed eye clearance position.

Thirdly, the pixel size of the microdisplays used in most of the existing designs is typically at least 15 μm or larger. As a result, relatively low optical power or long focal length is adequate for the eyepiece prism to achieve a moderate FOV. For instance, the pixel size of the microdisplay used in the design by Cheng et al is about 15 μm, which helps to mitigate the challenge of designing a large FOV system. In the more recent designs by Hua et al (2013), microdisplays with pixel size of around 10 μm, were adopted, which requires the freeform eyepiece to afford much higher optical resolution (e.g. 50 lps/mm for 10 μm pixels) than designs with larger pixel sizes (e.g. 33 lps/mm for 15 μm pixels). On the other hand, the microdisplays used in the design by Hua et al are about 0.8", which helps to mitigate the challenges of designing a high resolution system. In general, it is very challenging to design a freeform prism eyepiece achieving low F-number and high optical resolution for a broad spectrum without adding additional elements for chromatic aberration correction.

Finally, the freeform prism typically is symmetric about the plane in which the surfaces are rotated and decentered and the optical path is folded. For instance, the prism schematic in FIG. 1 was set to be symmetric about the vertical YOZ plane. The optical surfaces are decentered along the vertical Y-axis and rotated about the horizontal X-axis so that the optical path is folded in the vertical YOZ plane to form a prism structure. With this type of plane-symmetry structure, it is very challenging to achieve a wider field of view for the folding direction than the direction with symmetry. Therefore, most of the existing freeform prism eyepiece designs, including the recent work by Cheng et al [AO 2009] and Hua et al [Optics Express 2013], choose to fold the optical path in the direction corresponding to the direction of narrower FOV as shown in FIG. 1, which makes it easier to achieve total internal reflection (TIR) in surface S1' and maintain a valid prism structure. As most display applications typically prefer a landscape-type display, HMD systems typically align the wider FOV direction horizontally and the narrower FOV direction vertically. As a result, most of the freeform prism-based HMDs typically mount the microdisplays above the eyebrow, which leads to a front-heavy system and compromises the ergonomic design. Prism designs that fold the optical path along the wider FOV direction will allow mounting the microdisplays on the temple sides and mitigating the ergonomic challenge. In the prior art, there are a few exceptions where the freeform prism designs were folded in the direction corresponding to the wider FOV. For instance, Hu and Hua presented the design of a high-resolution freeform wedge prism which was folded in the wider FOV direction so that the prism was mounted horizontally [Hu and Hua, "High-resolution optical see-through multi-focal plane head-mounted display using freeform wedge prism," Optics Express, May 2014. Hu and Hua, "Design and tolerance of a freeform optical system for an optical see-through multi-focal plane display," Applied Optics, 2015.]. However, the microdisplay utilized in the system has larger pixels (about 15 μm) and larger dimensions (about 0.7" diagonally) and the system has a relatively smaller exit pupil (about 6 mm) than the present invention.

The existing body of work shows that it remains a great challenge to design a freeform eyepiece prism offering a wide field of view, high image resolution, large exit pupil for eye placement, sufficient eye clearance, and elegant ergonomic design. Accordingly, it would be an advance in the field of head-mounted displays and near-to-eye systems to provide an eyepiece design which overcomes these limitations.

Other aspects and features of the present invention will become apparent to those ordinarily skilled in the art upon review of the following description of specific embodiments of the invention in conjunction with the accompanying figures.

SUMMARY OF THE DISCLOSURE

It is an object of the present invention to mitigate limitations within the prior art relating to free-form prism-lens optics design for near-to-eye and head-mounted display systems. In accordance with an embodiment of the invention there is provided a free-form prism-lens configured with a first free-form surface to receive light from a micro-display and transmit the received light into the body of the prism-lens; a second free-form surface configured to receive the light transmitted into the body of the prism-lens from the first free-form surface and configured to reflect the received light at the second surface; and, a third free-form surface configured to receive the light reflected by the second free-form surface and to at least partially reflect the light back towards the second free-form surface and then out of the prism-lens, wherein the reflection at the second free-form surface and the at least partial reflection at the third free-form surface occurs within a selected folding plane, and wherein the prism-lens has a field-of view in the folding plane greater than the field-of view in a plane perpendicular to the folding plane. The free-form prism-lens may have a centre-field effective F/# of less than 3.5 and an exit pupil diameter of at least 8 mm. The prism-lens may optionally include an auxiliary lens disposed proximate to the third free-form surface such that the auxiliary lens compensates for the shift and distortion of rays from a real-world scene by the second and third surfaces of the prism-lens.

BRIEF DESCRIPTION OF THE DRAWINGS

Embodiments of the present invention will now be described, by way of example only, with reference to the attached Figures, wherein.

Figure 1:
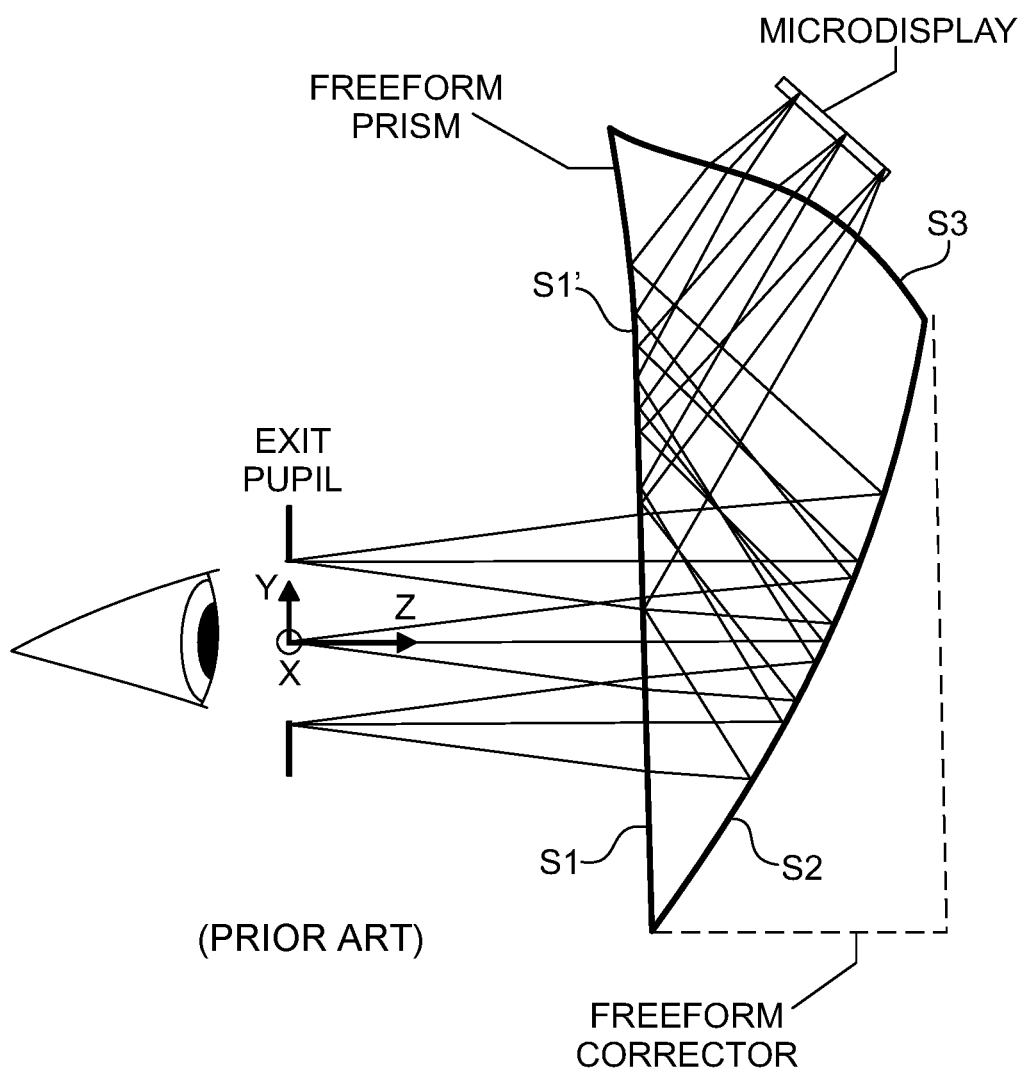
FIG. 1 depicts a prior-art free-form prism-lens-based near-to-eye display in which the optical folding occurs along the shorter vertical dimension and the micro-display is located above the users eye proximate to the eyebrow, along with an auxiliary lens for corrected viewing of real-world scenes.

Other aspects and features of the present invention will become apparent to those ordinarily skilled in the art upon review of the following description of specific embodiments of the invention in conjunction with the accompanying figures.

DETAILED DESCRIPTION

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention, it being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users. Reference to terms "including", "comprising", "consisting" and grammatical variants thereof do not preclude the addition of one or more components, features, steps, integers or groups thereof and that the terms are not to be construed as specifying components, features, steps or integers. Likewise the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

In order to address and overcome the challenges described above in respect of prior art prism eyepiece designs the inventors have established a single-element freeform prism eyepiece design methodology. Within embodiments of the invention presented within this specification a single-element freeform prism eyepiece design is presented that not only achieves a high optical resolution of less than 10 μm, but also offers a diagonal FOV of about 40°, a large exit pupil of 12 mm with low vignetting, and a large eye clearance distance greater than 21 mm. The microdisplay utilized in our prototype is a 0.5" organic light emitting display (OLED) with a 10 μm color pixel and pixel resolution of 1024×768. The eyepiece design itself, however, is able to support OLED panels of different dimensions or other type of microdisplays such as liquid crystal displays that have a pixel size greater than 8 μm.

Figure 2:
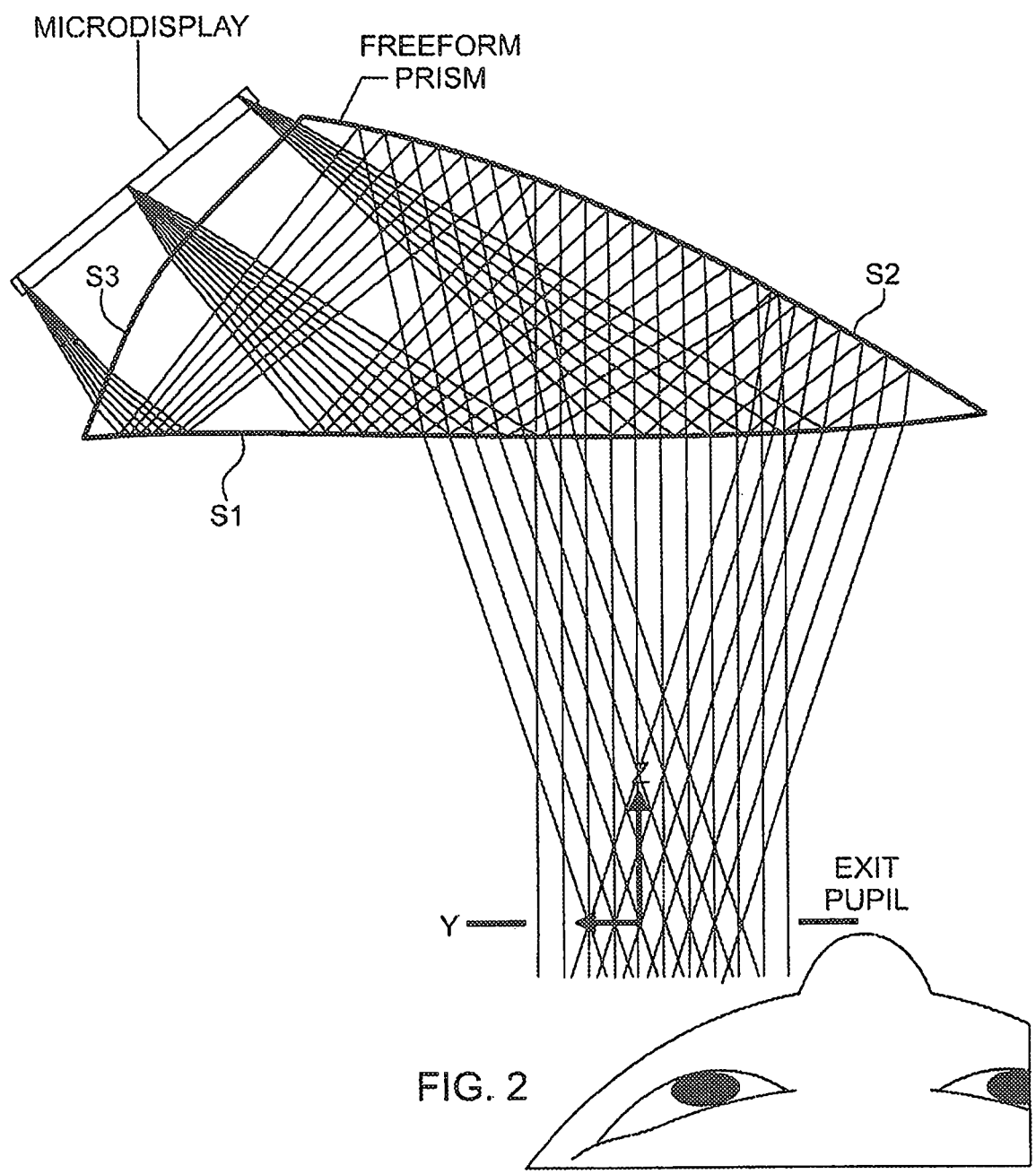
FIG. 2 depicts an embodiment of the invention of a free-form prism-lens absent any auxiliary optical elements wherein the coordinate axes have been rotated such that the display is located proximate to the user's temple, and the optical folding within the free-form prism-lens occurs in a selected plane along the wider horizontal field of view.
Figure 3:
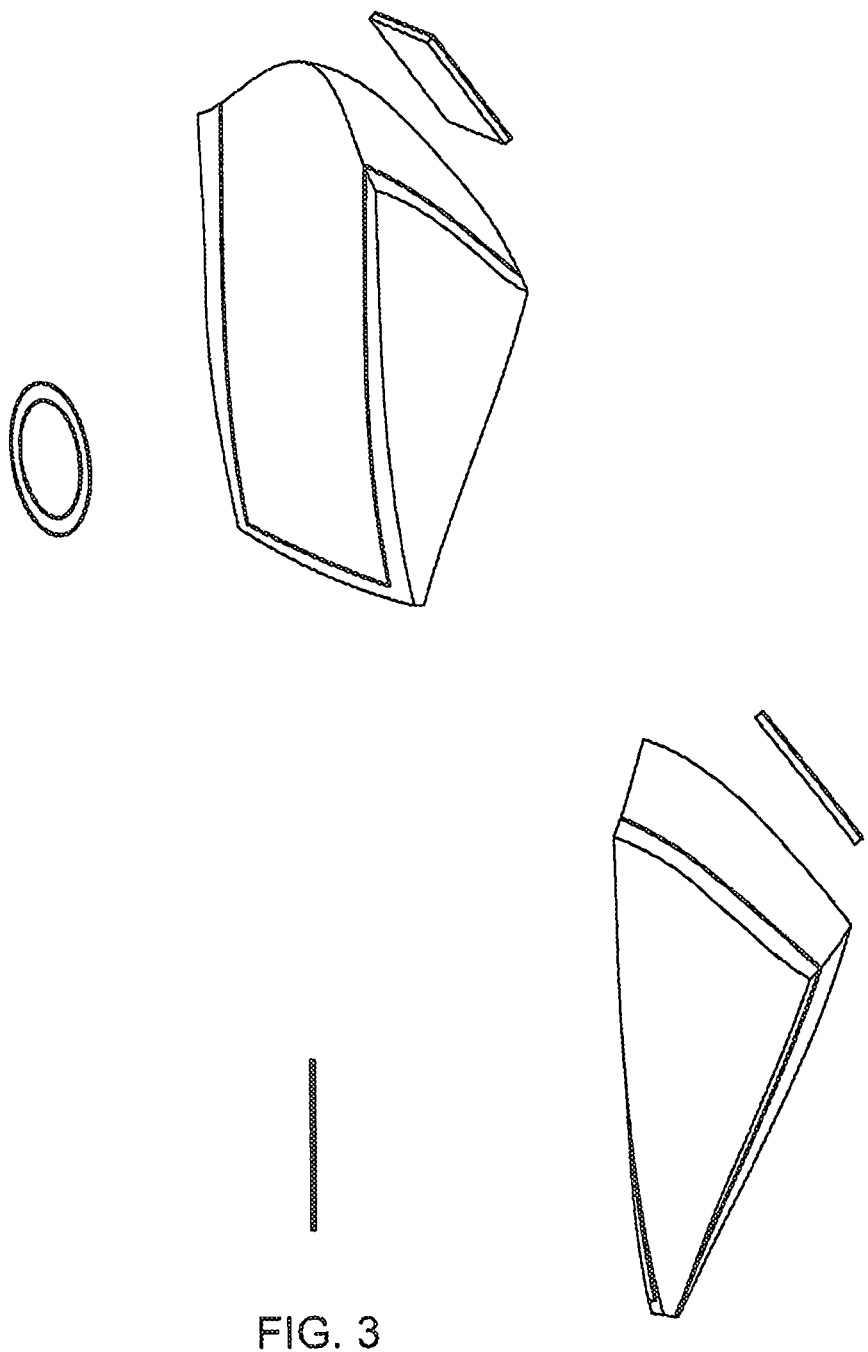
FIG. 3 depicts a 3D CAD model of a prism-lens design according to an embodiment of the invention in perspective and plan views.
Figure 4:
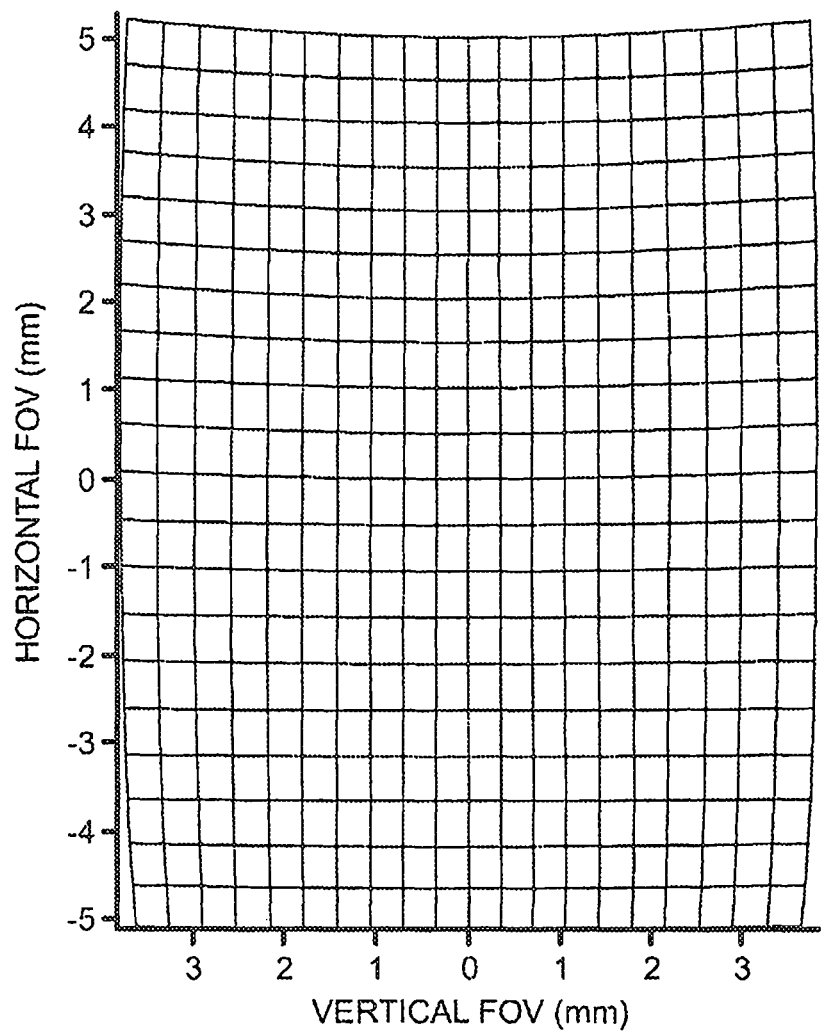
FIG. 4 depicts the distortion grid of the prism-lens design according to the embodiment of the invention depicted in FIG. 3.

FIGS. 2 and 3 show the 2D optical layout and 3D CAD model, respectively, of a free-form prism-lens according to an embodiment of the invention absent any auxillary optical elements. A ray emitted from a point on the microdisplay is first refracted by the surface S3 next to the microdisplay. After two consecutive reflections by the surfaces S1' and S2, the ray is transmitted through the surface S1 and reaches the exit pupil of the system. The first surface (i.e., S1 and S1' of the prism is required to satisfy the condition of total internal reflection for rays reflected by this surface S1'. The rear surface S2 of the prism may be coated with a reflective coating for building an immersive HMD system which blocks the view of the real world scene. Alternatively, the surface S2 may be uncoated or coated with a partially reflective beamsplitting coating if optical see-through capability is desired using the auxiliary lens.

It should be noted that in the design disclosed according to an embodiment of the invention is presented with the global reference coordinate system centered with respect to the exit pupil, like most of the existing freeform prism designs. However, the reference axes are set differently from the existing designs presented within the prior art. Here the Z-axis is along the viewing direction, but the Y-axis is parallel to the horizontal direction aligning with interpupilary direction, and the X-axis is in the vertical direction aligning with the head orientation. In other words, the reference coordinate system is rotated 90-degrees around the Z-axis. As a result, the overall prism system is symmetric about the horizontal (YOZ) plane, rather than the typical left-right symmetry about the vertical plane. The optical surfaces (S1, S2, and S3) are decentered along the horizontal Y-axis and rotated about the vertical X-axis. As a result, the optical path is folded in a selected plane, i.e., the horizontal YOZ plane, corresponding to the direction of wider field of view, to form a prism structure. This arrangement allows the microdisplay to be mounted on the temple side of the user's head, resulting in a much more balanced and ergonomic system packaging concept than a typical vertical-folding design with the microdisplay located above the eyebrow. It would be further evident that in the embodiments of the invention described within this specification that they differ from a typical vertical-folding design in which the FOV in the folding direction is narrower than the non-folding direction. Rather, embodiments of the invention has a FOV in the folding direction is much wider than the non-folding direction, e.g., perpendicular to the selected plane, which makes a high-performance design very challenging.

The overall specifications of an exemplary optical system within which free-form prism-lenses according to embodiments of the invention may be exploited is summarized in Table 1. The inventor's goal is to achieve a very compact, lightweight, and wide FOV design using a wedge-shaped freeform prism with a large exit pupil and high optical resolution. Another requirement is to mount the microdisplays on the temple sides to avoid front-heaviness and improve ergonomic balance, which requires folding the optical path within the prism along the wider FOV direction. A small size microdisplay with high resolution was thus preferred. Based on the size, resolution, availability and cost, a 0.5-inch organic light emitting display (OLED) was selected, with a resolution of 1024×768 pixels and an about 10 μm pixel size. The inventors further targeted an HMD system with a diagonal full FOV of about 40°, which corresponds to a focal length around 18 mm. This combination offers a reasonable balance between FOV and angular resolution (1.8 arc minutes per pixel). In the design of visual instruments, especially HMDs, a large exit pupil is typically preferred to account for the swiveling of the eyes in their sockets without causing vignetting or loss of image. A large pupil offers better tolerance of the interpupilary distances (IPD) among different users without the need to mechanically adjust the eyepiece optics, and can allow moderate electronic IPD adjustment by laterally displacing the displayed pixels. A large pupil, however, often not only compromises the compactness and weight of the optical system, but also imposes limitations on the FOV due to the dramatically increased challenge of designing low F/# systems. Taking into account these factors, the inventors set the exit pupil diameter to be 12 mm with no more than 40% vignetting at the maximum field positions, which leads to a system with an F/# of about 1.5 for the center fields. In designing HMD systems, a large eye clearance is desired to accommodate users wearing eyeglasses, but it affects the compactness of the viewing optics. A minimum of a 20 mm eye clearance was set to accommodate users wearing low-eyeglasses.

Among the aberrations of an optical system, distortion causes the warping of the displayed image without reducing image sharpness, which allows computational or electronic correction. In designing conventional HMDs it is common to optimize the system to minimize the optical aberrations that reduce image quality which cannot be compensated electronically or computationally. In a freeform prism eyepiece, however, the distortion can be very large and irregular if it is left without any constraints. The inventors thus set a distortion limit of 10% at the maximum field angle and assume that the residual distortion is corrected using computational methods. In terms of other types of aberrations, the modulation transfer function (MTF) was selected to evaluate the overall image sharpness and was set to be no less than 10% across the entire visual field at a spatial frequency of 50 lps/mm which corresponds to the Nyquist sampling frequency of the microdisplay.

TABLE 1

Specifications of one embodiment of the FFS Prism-lens HMD System

| Parameter | Specification |
| --- | --- |
| Microdisplay | |
| Size | 0.5 inches (12.7 mm) diagonally |
| Active display area | 10.14 mm × 7.6 mm |
| Resolution | 1024 × 768 pixels |
| Pixel size | 10 μm |
| Eyepiece | |
| Type | folded freeform prism |
| Effective focal length | ~18 mm |
| Exit pupil diameter | 12 mm |
| Eye Clearance | >20 mm |
| Eye relief | >23 mm |
| F/# | 1.5 |
| Number of freeform surfaces | 3 |
| Wavelength | 650-465 nm |
| Field of view | >30° (H) × 23°(V) |
| Vignetting | <40% for top and bottom fields |
| Distortion | <10% at the maximum field |
| Image quality | MTF > 10% at 50 lps/mm |
| Optical path folding direction | Horizontal plane |

It is important to select a suitable method for a freeform surface representation. Different representation methods not only have different impacts on the ray tracing speed and the convergence of optimization, but also offer different degrees of design freedom. A suitable representation method should 1) provide adequate degrees of freedom; 2) require a reasonable amount of ray tracing time; 3) offer reliable convergence in the optimization process; and 4) be orthogonal.

Many types of orthogonal or non-orthogonal polynomial equations can be utilized to describe a freeform surface. For instance, a freeform surface could be represented by Equations (1A) and (1B).

$$z = \frac{c_x x^2 + c_y y^2}{1 + \sqrt{(1-(1+k)c_x x^2 - (1+k)c_y y^2)}} + \sum_{j=1}^{37} C_j x^{2n} y^n \quad (1A)$$

$$2m + n \leq 10; m = 0, 1, 2, \ldots, 10; \quad n = 0, 1, 2, \ldots, 10 \quad (1B)$$

where z is the sag along the local z-axis, x and y are the coordinates in the local coordinate system, k is the conic constant, cx is radius of curvature of surface in sagittal direction, $c_y$ is radius of curvature of surface in tangential direction, and $C_j$ is the coefficient for $x^{2m}y^n$. As an embodiment example, the inventors chose to use a user-defined surface representation, known as Yabe surfaces (A. Yabe, "Representation of freeform surface suitable for optimization," Applied Optics, 2012), after taking into account these factors listed above. A freeform surface shape symmetric to the X-axis is represented by an axially asymmetric quadratic and a set of orthogonal polynomials as give by Equation (2).

$$z(x, y) = \frac{c_{xx} x^2 + 2c_{xy} xy + c_{yy} y^2}{1 + \sqrt{1 - \gamma(c_{xx} x^2 + 2c_{xy} xy + c_{yy} y^2)}} + \quad (2)$$

-continued $$\sum_{n=0}^{N}\sum_{k=0}^{n}b_n^{n-2k}W_n^{n-2k}(x/r_0,y/r_0)$$

where z is the sag along the local z-axis, x and y are the coordinates in the local coordinate system, $c_{xx}$, $c_{yy}$, and $cx_{xy}$ are the curvature tensor at the origin, is a conic-like constant, and $r^0$ is the radius of the surface. The orthogonal polynomials on the unit circle are expressed by Equations (3) and (4) where u=σ sin θ and v=σ cos θ.

$$W_n^m(u,v)=Q_n^m(\rho)\cos(m\theta) \quad (3)$$

$$W_n^{-m}(u,v)=Q_n^m(\rho)\sin(m\theta) \quad (4)$$

With this orthogonal surface representation, the paraxial properties, high-order surface shapes, and surface tilt are clearly separated. Most of the commercially available optical design software tools, such as CODE V® (Optical Research Associates, Pasadena, Calif.), provide the ability to model freeform surfaces in user-defined methods. Though the ray tracing speed of user-defined representations typically is much slower than the standard methods available in the software packages, the orthogonal surface representation could yield more efficient and compact surface representation than the more commonly used xy-polynomials and result in faster convergence during design optimization.

As an embodiment example, Tables 2 through 5 provide surface data for the design of the free-form prism-lens according to the embodiment of the invention depicted within FIG. 2. Table 2 defines the surface references of each optical surfaces, S1 through S3 as well as the microdisplay in the global coordinate system. Tables 3 through 5 provide the optimized coefficients defining the optical surfaces S1 through S3.

TABLE 2

Definition of the local surface references in the global coordinate system.

| | Origin of surface reference | | | Orientation of the surface |
|---|---|---|---|---|
| | X (mm) | Y (mm) | Z (mm) | Rotation about X-axis θ (°) |
| Surface S1 | 0 | −0.2 | 21.3 | 3.1 |
| Surface S2 | 0 | 3.3 | 31.8 | −24.1 |
| Surface S3 | 0 | 22.5 | 29.6 | 42.6 |
| Microdisplay | 0 | −0.8 | 4.01 | −5.6 |

TABLE 3

Surface S1 (Yabe-Polynomial Freeform)

| Parameter | Value |
|---|---|
| Y Radius | 91.762447 |
| C1: Curvature tensor Cxx | 0.0036021 |
| C2: Cxy | 0 |
| C3: Gamma | −0.045698 |
| C4: normalization radius | 40 |
| C5: highest radial order | 10 |
| C6: Q+3 −3 | −3.8251964 |
| C7: Q+3 −1 | −7.8131066 |
| C8: Q. +3. +1 | 0 |
| C9: Q. +3. +3 | 0 |
| C10: Q. +4. −4 | 0 |
| C11: Q. +4. −2 | 0 |
| C12: Q. +4. +0 | −5.22786 |
| C13: Q. +4. +2 | −1.68526 |
| C14: Q. +4. +4 | 0.185831 |

TABLE 4

Surface-S2 (Yabe-Polynomial Freeform)

| Parameter | Value |
|---|---|
| Y Radius | −105.41783 |
| C1: Curvature tensor Cxx | −0.0172469 |
| C2: Cxy | 0 |
| C3: Gamma | 0.106071 |
| C4: normalization radius | 30 |
| C5: highest radial order | 10 |
| C6: Q+3 −3 | −0.7242956 |
| C7: Q+3 −1 | −3.7856926 |
| C8: Q. +3. +1 | 0 |
| C9: Q. +3. +3 | 0 |
| C10: Q. +4. −4 | 0 |
| C11: Q. +4. −2 | 0 |
| C12: Q. +4. +0 | 2.56310988624996 |
| C13: Q. +4. +2 | −0.2917081 |
| C14: Q. +4. +4 | −0.0822885 |

TABLE 5

Surface-3 (Yabe-Polynomial Freeform):

| Parameter | Value |
|---|---|
| Y Radius | −29.999992 |
| C1: Curvature tensor Cxx | −0.1751531 |
| C2: Cxy | 0 |
| C3: Gamma | 0.4759008 |
| C4: normalization radius | 20 |
| C5: highest radial order | 8 |
| C6: Q+3 −3 | −4.6906243 |
| C7: Q+3 −1 | −4.1547693 |
| C8: Q. +3. +1 | 0 |
| C9: Q. +3. +3 | 0 |
| C10: Q. +4. −4 | 0 |
| C11: Q. +4. −2 | 0 |
| C12: Q. +4. +0 | −2.6724760 |
| C13: Q. +4. +2 | 6.31904234 |
| C14: Q. +4. +4 | 3.32686085 |

Figure 5A:
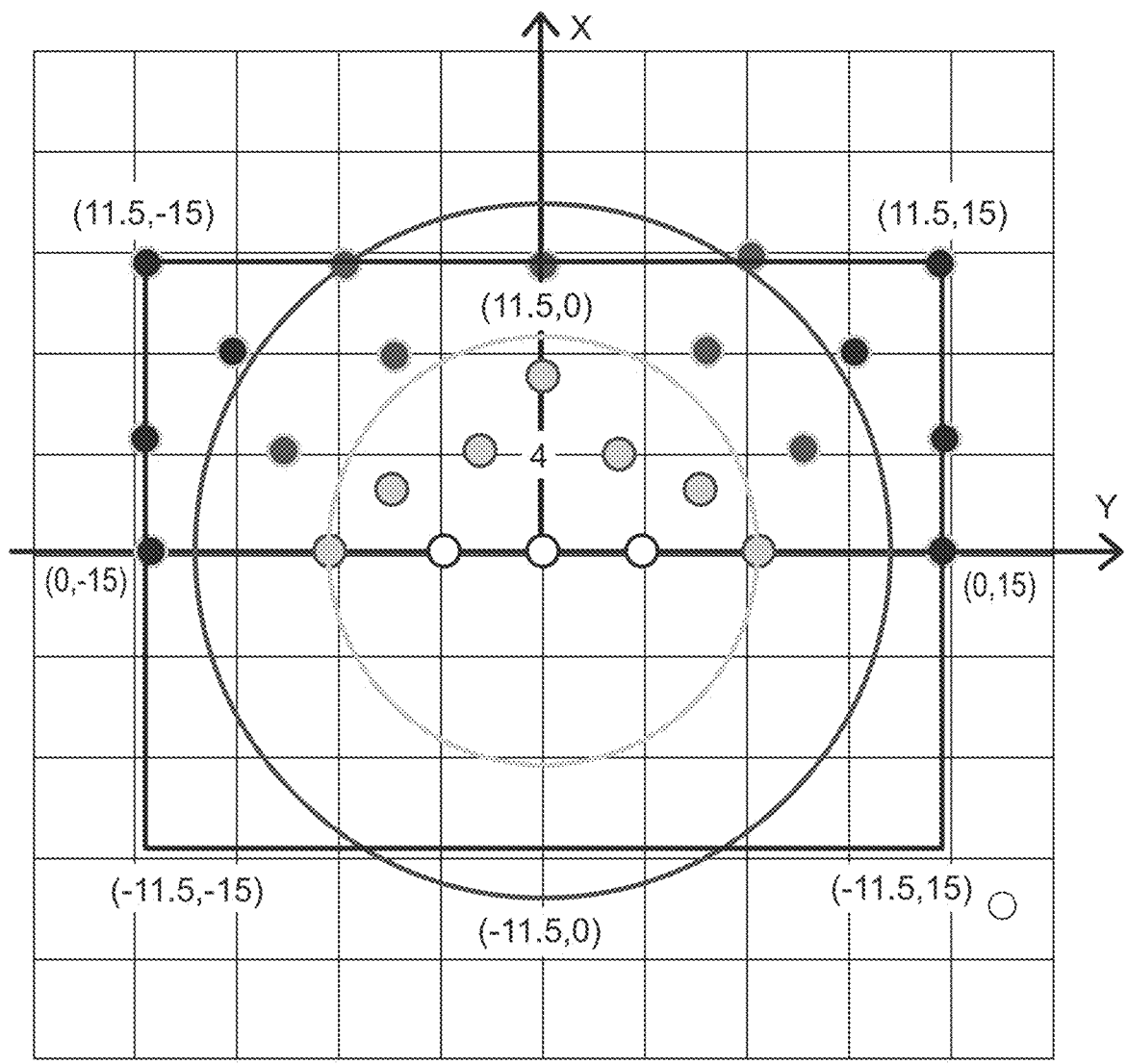
FIG. 5A depicts point-clouds of decreasing proximity to the centre-of-field shown in gradually from light to dark shades of gray, with red represented by the lightest shade and blue represented by the darkest shade, for the prism-lens according to the embodiment of the invention depicted in FIG. 3.
Figure 5B:
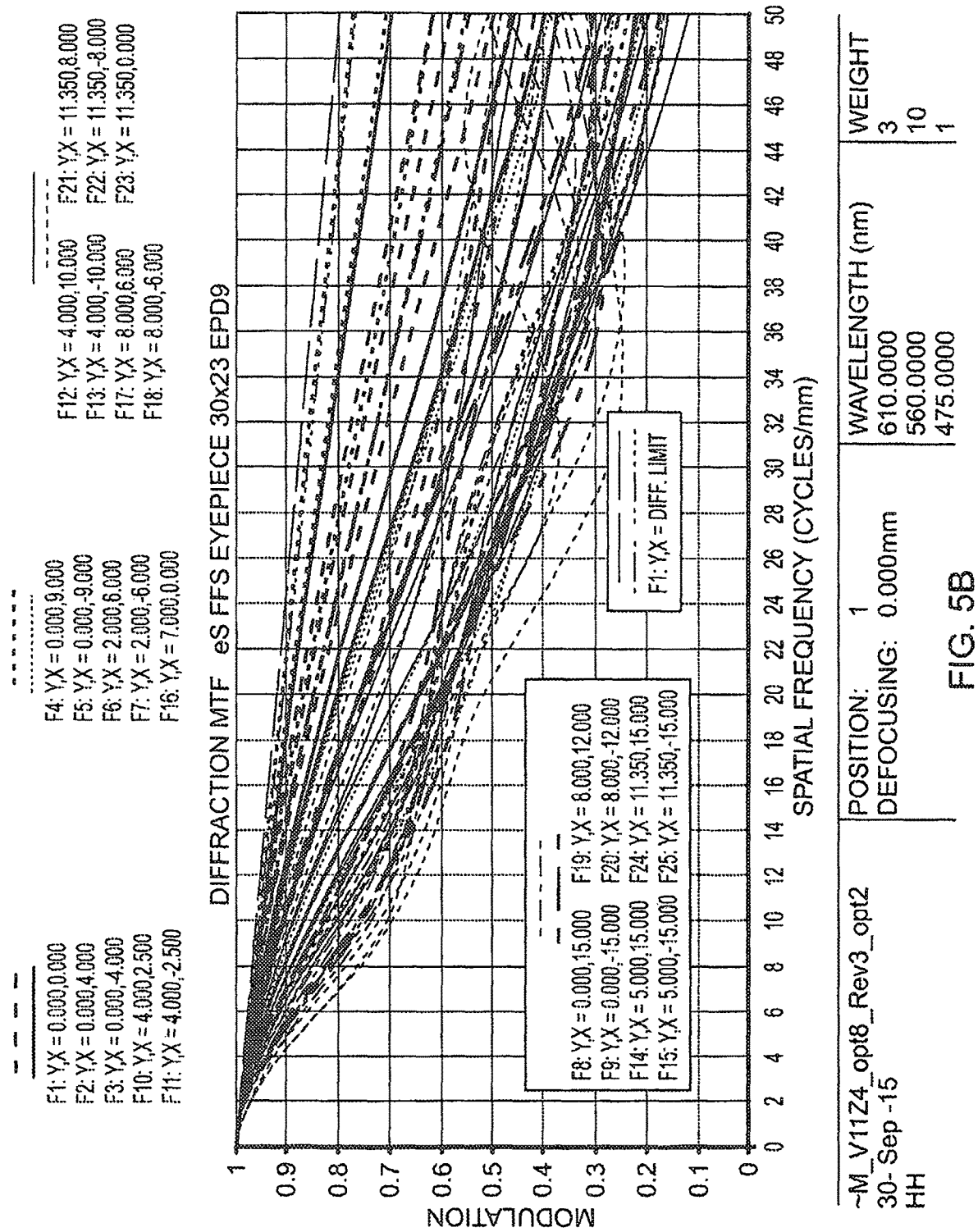
FIG. 5B depicts the modulation transfer function of the design for points shown in FIG. 5A.
Figure 6A:
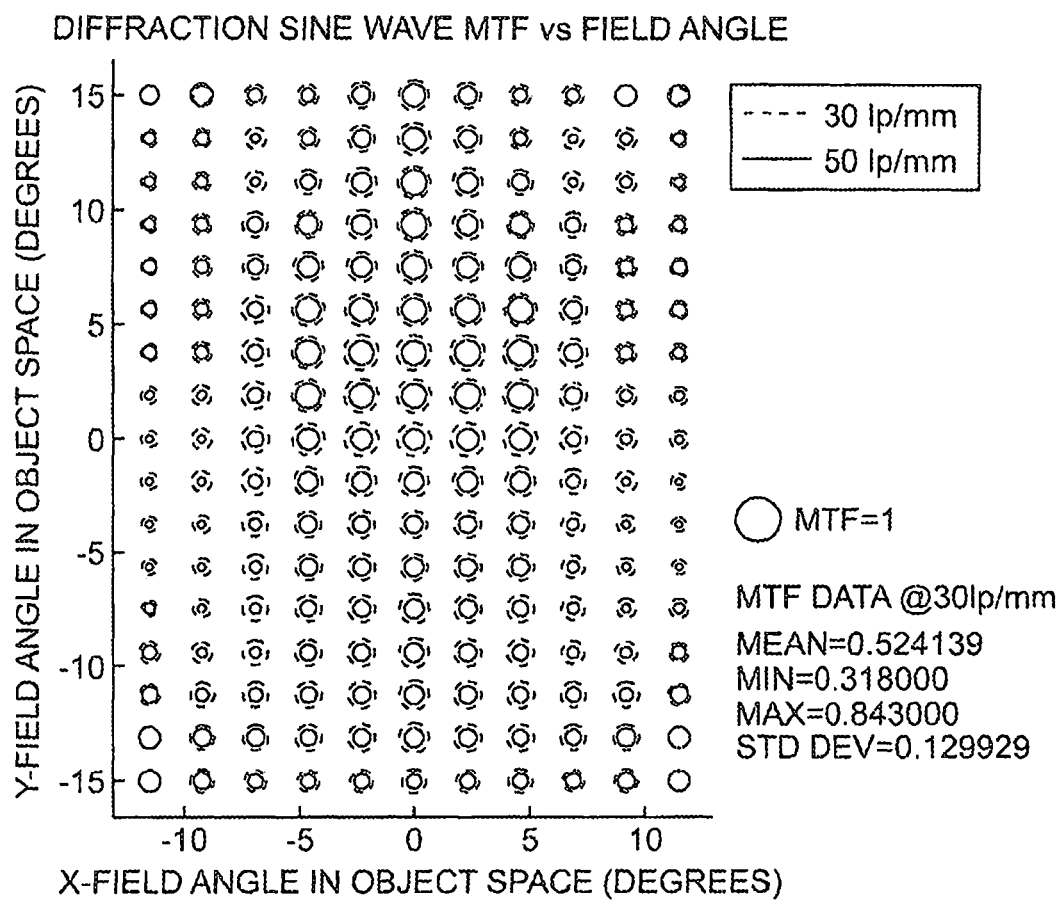
FIGS. 6A to 6E respectively depict the full-field plot of the polychromatic MTF values of the prism-lens according to an embodiment of the invention depicted in FIG. 3 with a 3-mm exit pupil at the pupil positions of (0,0); (0, −2 mm), (0, +2 mm), (−2 mm,0); and (2 mm, 0) respectively.
Figure 6B:
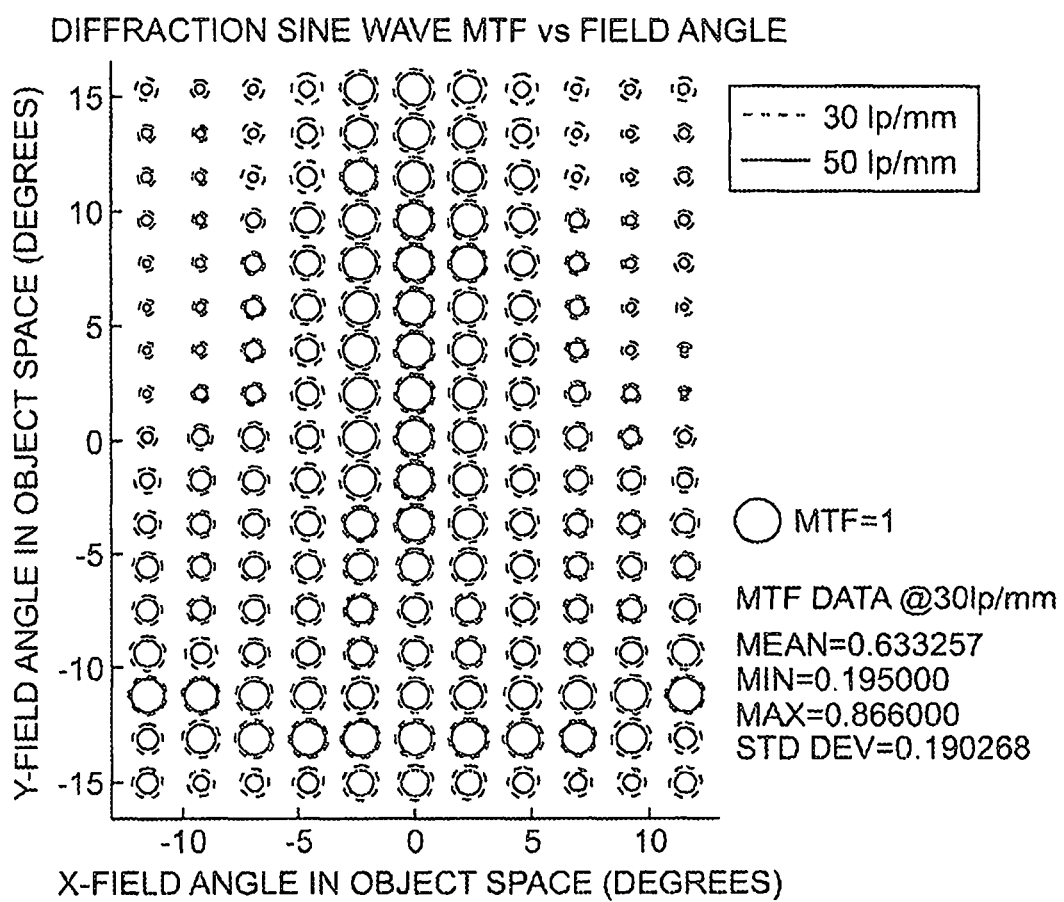
Figure 6C:
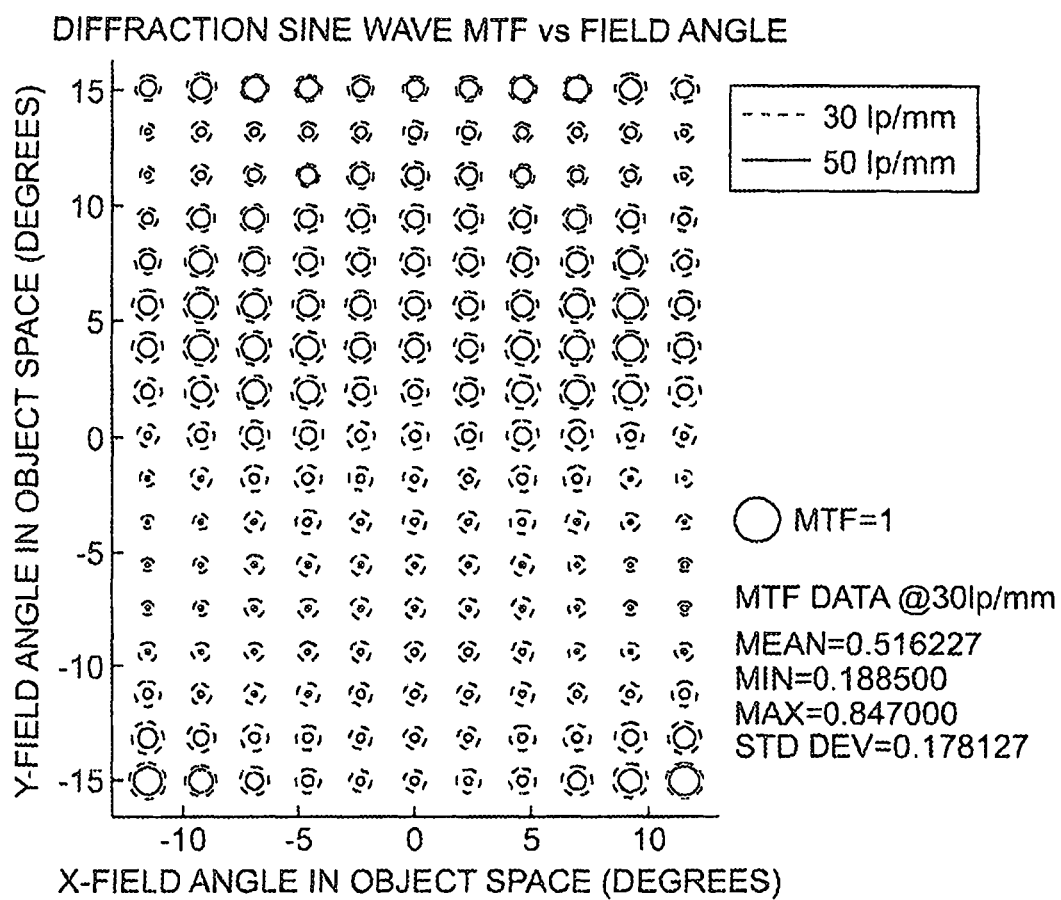
Figure 6D:
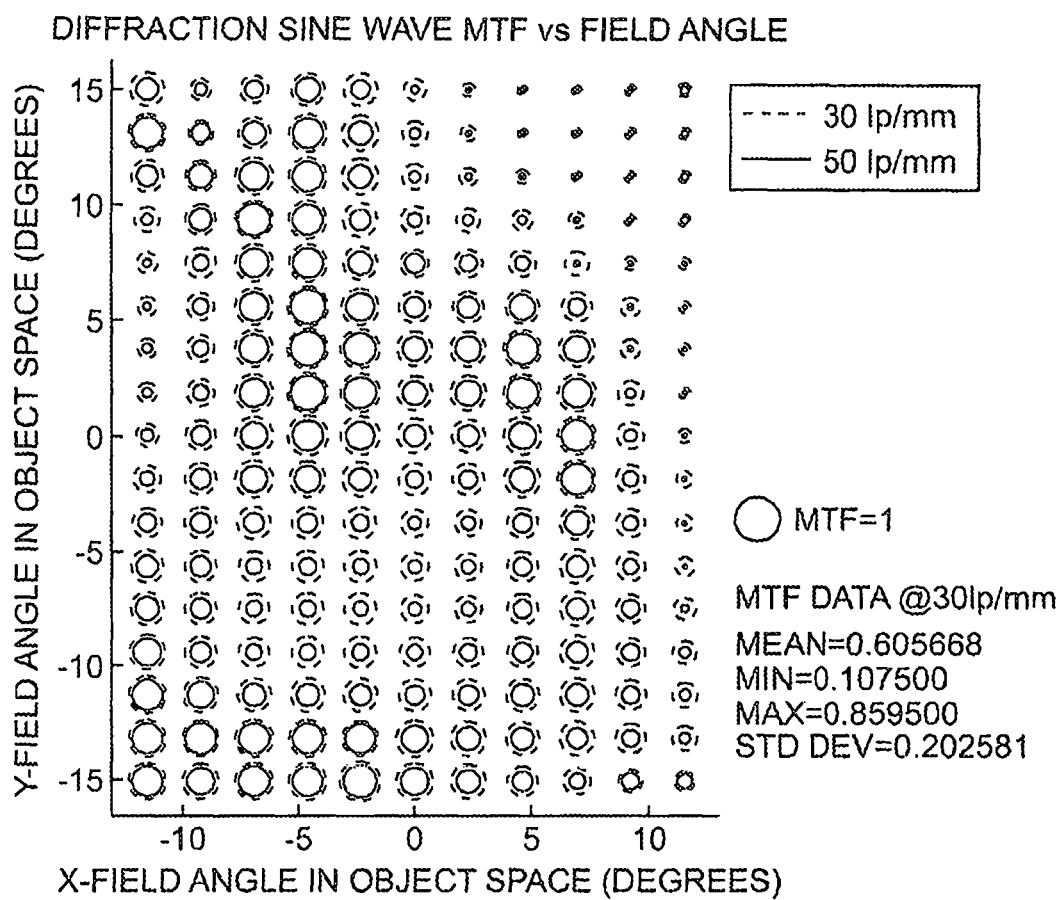
Figure 6E:
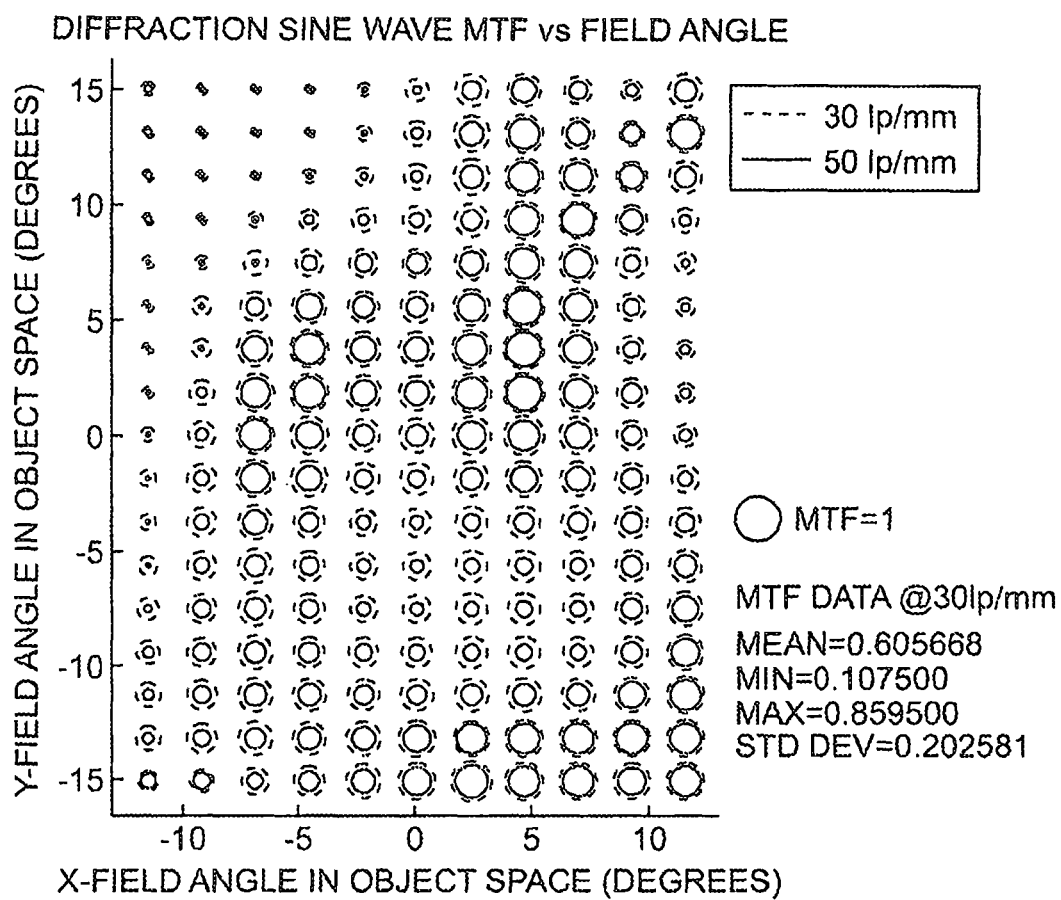

During the design process, three representative wavelengths, 475 nm, 560 nm, and 610 nm were selected in order to correspond with the peak emission spectra of the blue, green and red emitters within the selected microdisplay. The optical performance of the designed system was assessed at representative field angles for these three design wavelengths. Referring to FIGS. 4 through 6E respectively there are depicted the optical performance results for the free-form prism-lens according to the embodiment of the invention depicted within FIG. 2. The distortion shown in FIG. 4 implies the system distortion is well controlled, being less than 5% at the edge of the field of view. The polychromatic MTF curves for 25-sampled fields are shown in FIG. 5, which were evaluated for a centered 3-mm pupil. The spatial frequency of 50 cycles/mm corresponds to the threshold spatial frequency of the microdisplay with a 10 μm pixel size. The system achieved nearly 20% MTF value for the maximum field angle at the spatial frequency of 50 cycles/mm and an average MTF value of about 50% for the center 60% of the field of view. The average MTF is greater than 50% across the entire field of view at the frequency of 33 cycles/mm corresponding to a microdisplay pixel of 15 μm. In other words, the optical resolution of this disclosed prism design is much higher than the existing prism designs. FIGS. 6A to 6E respectively depict the full-field plot of the MTF distribution across the entire display field of view for the frequencies of 50 cycles/mm and 30 cycles/mm for a 3-mm pupil placed at five locations, namely centered (0,0), (0, −2), (0,2) (−2,0) and (2,0), respectively.

As a design constraint applied to the design of the free-form prism-lens according to an embodiment of the invention depicted in FIG. 2 was that the prism design utilizes a single type of optical material, for instance Poly Methyl MethAcrylate (PMMA) or a Cyclo Olefin Polymer (COP), the full correction of chromatic aberrations due to optical dispersion is not feasible. This is often a limiting factor for designing a freeform prism with high optical resolution for a broad optical spectrum. The embodiment of the invention presented within FIG. 2 was designed for use in conjunction with an organic light emitting display (OLED) which has a larger color gamut than some of the other common commercial microdisplay technologies. Accordingly, the optical performance needs to be balanced for a broad visible spectrum.

Figure 7A:
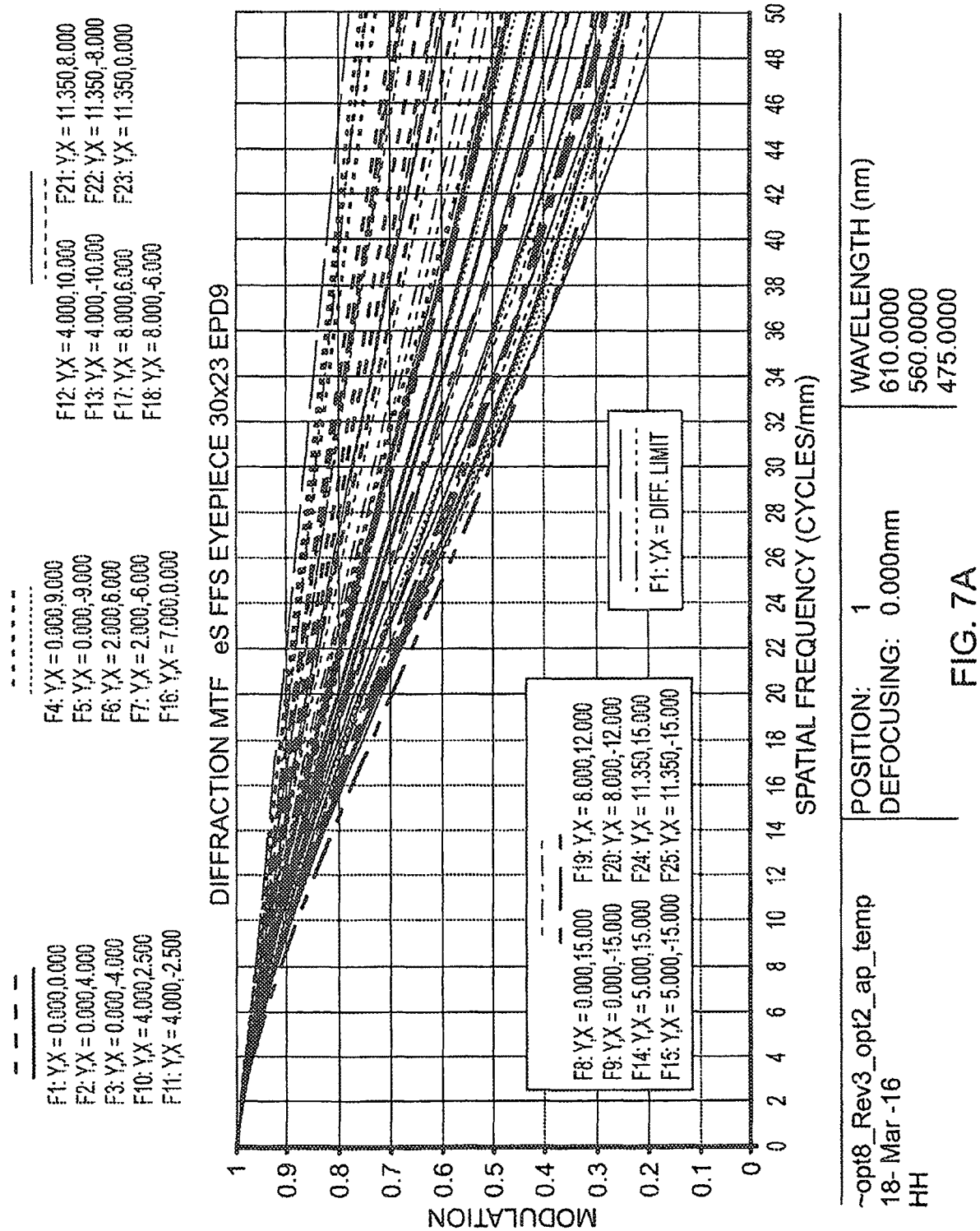
FIGS. 7A to 7C respectively depict the MTF plots of the prism-lens according to an embodiment of the invention depicted in FIG. 3 for three sampled wavelengths, 610 nm, 560 nm, and 475 nm respectively, with a 3-mm centered pupil for the embodiment of the invention depicted in FIG. 3.
Figure 7B:
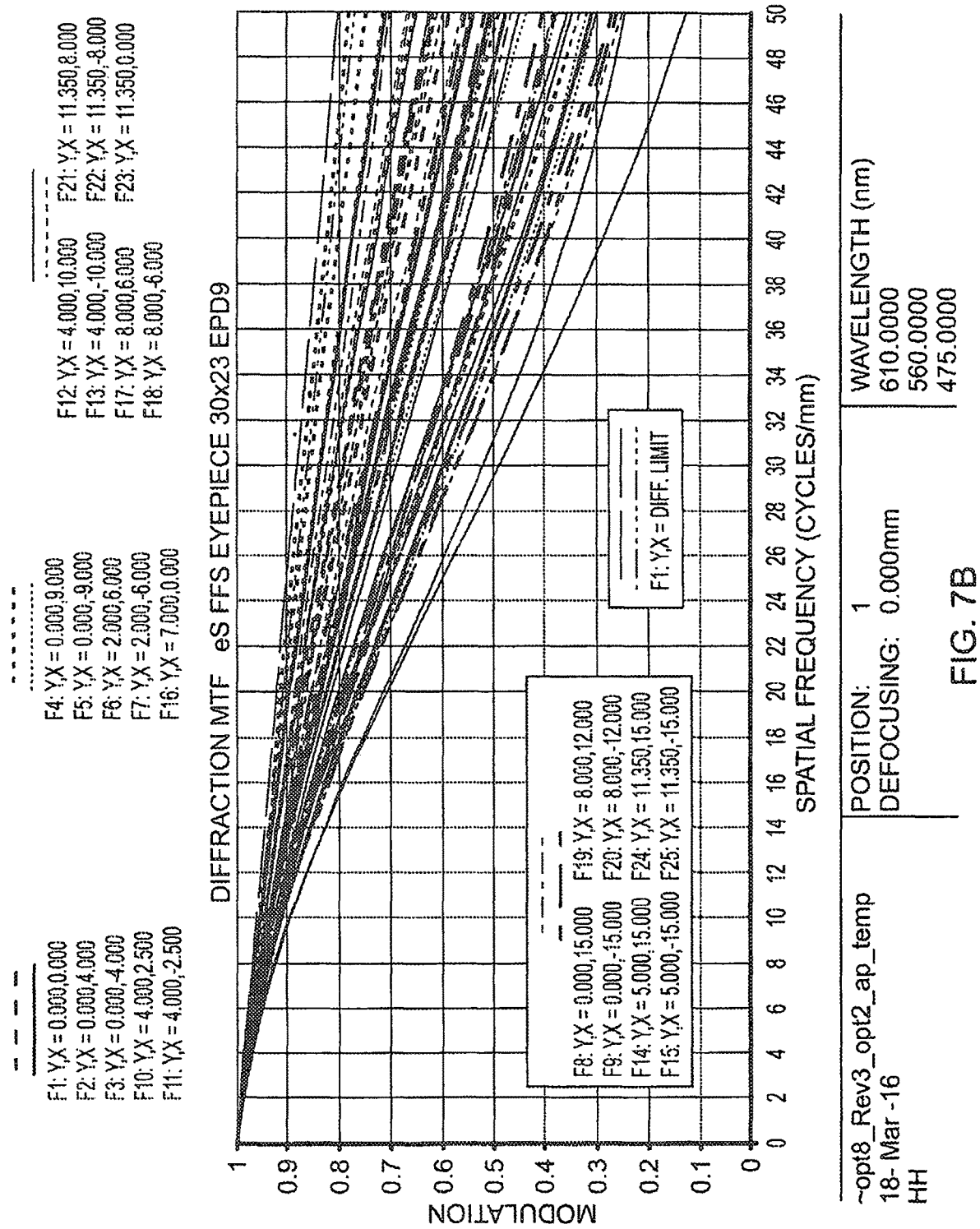
Figure 7C:
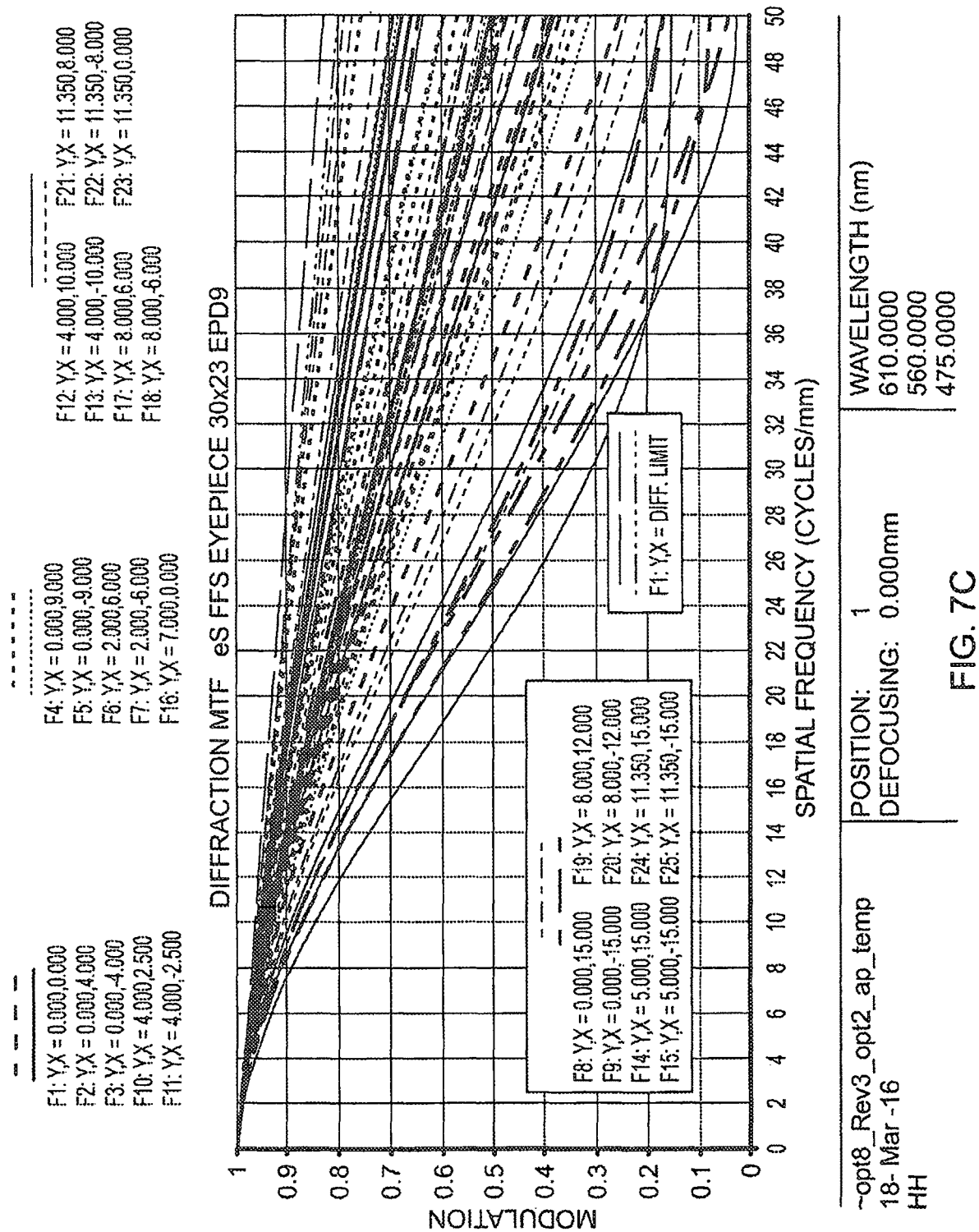

In order to achieve high optical resolution, the inventors analysed the system response and adjusted the design by strategically adjusting the weights on three sampled wavelengths (475 nm, 560 nm, and 610 nm) such that the performance of the optical system was corrected for each of the individual wavelengths whilst leaving chromatic aberration under-corrected. As a result, the image formed by each individual wavelength has achieved very high resolution, while the display position of any given image point can be separated from those of other wavelengths originating from the same pixel position on the micro-display. FIGS. 7A to 7C respectively depict the MTF plots for these three sampled wavelengths, 610 nm, 560 nm, and 475 nm, respectively, for a 3-mm centered pupil. These MTF plots demonstrate that the system forms superior image for each individual color image.

Figure 8:
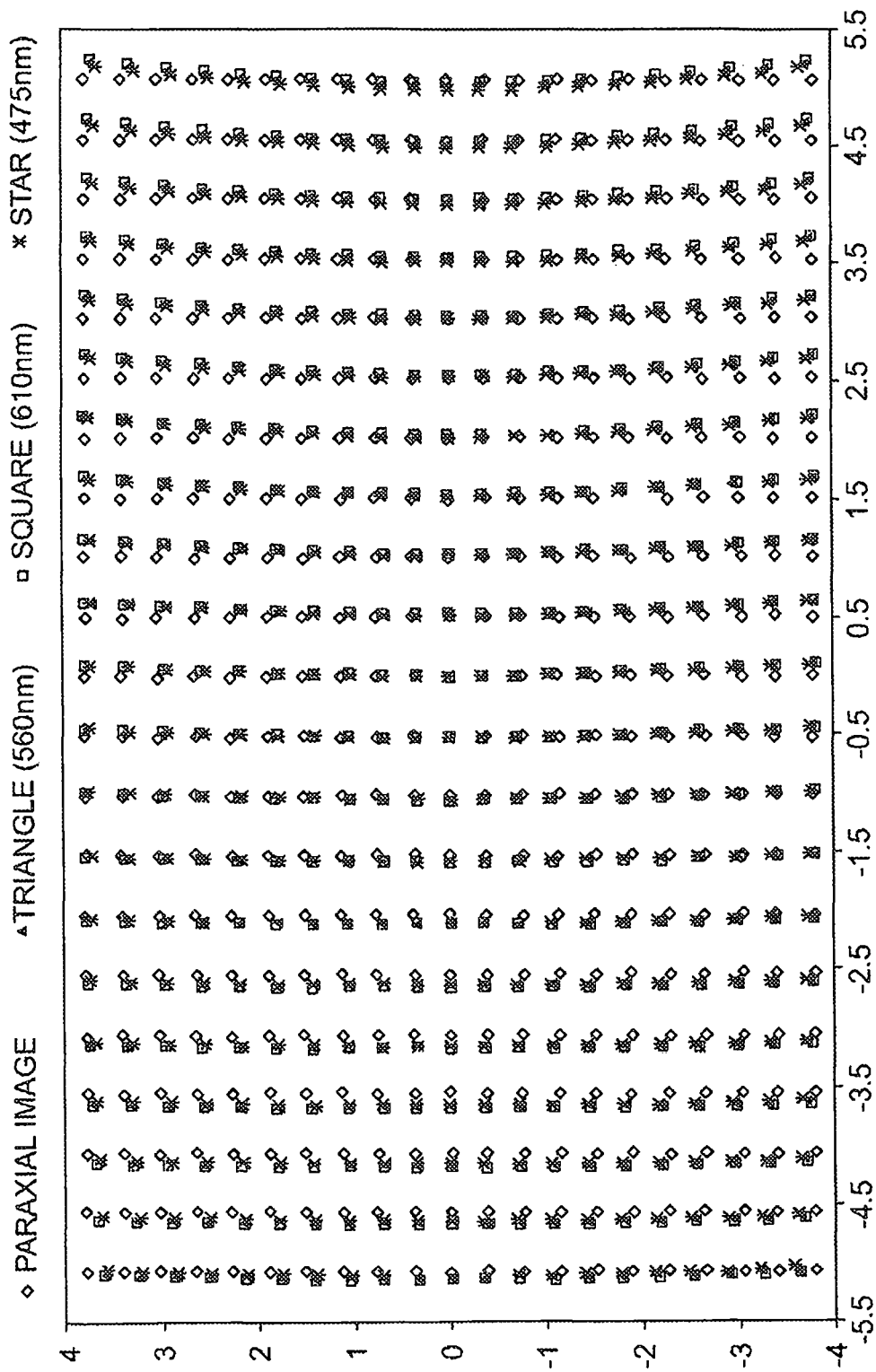
FIG. 8 depicts the full-field map of the image positions distorted by the prism-lens according to an embodiment of the invention depicted in FIG. 3 corresponding to the three sampled wavelengths (610 nm, 560 nm, and 475 nm) along with the paraxial image positions.

Such spatial displacements among different color elements, on the other hand, can be digitally corrected by applying a pre-warping operation to each individual color channel. FIG. 8 plots the full-field map of the image positions corresponding to the three sampled wavelengths, 610 nm, 560 nm, and 475 nm, respectively, along with the paraxial image positions. This full-field map provides data not only for image distortion correction, but also to correct spatial displacements among different color elements for electronic pre-compensation of chromatic aberration before display.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A free-form prism-lens constructed of a material with refractive index greater than 1 for use in a near-to-eye display system comprising:
   a. a first free-form surface configured to receive light from a micro-display and transmit the received light into the body of the prism-lens;
   b. a second free-form surface configured to receive the light transmitted into the body of the prism-lens from the first free-form surface and configured to reflect the received light at the second surface; and
   c. a third free-form surface configured to receive the light reflected by the second free-form surface and to at least partially reflect the light back towards the second free-form surface and then out of the prism-lens,
   wherein the reflection at the second free-form surface and the at least partial reflection at the third free-form surface occurs within a selected folding plane, and wherein the prism-lens has a field-of view in the folding plane greater than the field-of view in a plane perpendicular to the folding plane, and wherein the spatial distortion at maximum field angle is less than 10%.

2. The free-form prism-lens of claim 1, wherein said prism-lens has a center-field effective F/# of less than 3.5 and an exit pupil diameter of at least 8 mm.

3. The free-form prism-lens of claim 1, wherein at least one of the three free-form surfaces of the free-form prism-lens is described by an axially asymmetric quadratic and a set of orthogonal polynomials:

$$z(x,y) = \frac{c_{xx}x^2 + 2c_{xy}xy + c_{yy}y^2}{1+\sqrt{1-\gamma(c_{xx}x^2 + 2c_{xy}xy + c_{yy}y^2)}} + \sum_{n=0}^{N}\sum_{k=0}^{n} b_n^{n-2k} W_n^{n-2k}(x/r_0, y/r_0)$$

where z is the sag along the local z-axis, x and y are the coordinates in the local coordinate system, $c_{xx}$, $c_{yy}$, and $c_{xy}$ are the curvature tensor at the origin, $\gamma$ is a conic-like constant, $r_0$ is the radius of the surface, and the orthogonal polynomials on the unit circle are expressed as:

$$W_n^m(u,v) = Q_n^m(\rho)\cos(m\theta) \text{ and } W_n^{-m}(u,v) = Q_n^m(\rho)\sin(m\theta)$$

Where $u=\rho\sin\theta$ $v=\rho\cos\theta$.

4. The free-form prism-lens of claim 1, wherein the third free-form surface is coated with a reflective coating to reflect all light from the second free-form surface back towards the second free-form surface and then to exit the free-form prism-lens.

5. The free-form prism-lens of claim 1, wherein the third free-form surface, in addition to reflecting light from the second free-form surface back towards the second free-form surface and then to exit the free-form prism-lens also admits light from outside the free-form prism from real-world scenes to also be transmitted towards the second free-form surface and then to exit the free-form prism-lens.

6. The free-form prism-lens of claim 1, comprising an auxiliary lens disposed proximate to the third free-form surface, the auxiliary lens configured to minimize the shift and distortion of rays from a real-world scene by the second and third free-form surfaces.

7. The free-form prism-lens of claim 6 wherein the auxiliary lens has a surface with the same shape as the third free-form surface of the prism-lens and is disposed in optical contact with the third free-foi fn surface of the prism-lens.

8. The free-form prism-lens of claim 1, wherein the eye-clearance is at least 18 mm.

9. The free-form prism-lens of claim 1, wherein the field-of view of the prism-lens in the folding plane is at least 28 degrees.

10. The free-form prism-lens of claim 1, wherein the field-of view of the prism-lens in the plane perpendicular to the folding plane is at least 21 degrees.

11. The free-form prism-lens of claim 1, wherein the effective focal length is less than 20 mm.

12. The free-form prism-lens of claim 1, wherein the vignetting at the maximum field positions is less than 40%.

13. The free-form prism-lens of claim 1, wherein the microdisplay has a pixel pitch of 7.5 microns or larger.

14. The free-form prism-lens of claim 1, wherein the modulation transfer function across the entire field of view is greater than 30% at the spatial frequency of 33 line-pairs/mm and greater than 10% at the spatial frequency of 50 line-pairs/mm.

15. The free-form in prism lens of claim 1, wherein the prism-lens is formed through an injection-moulding process.

16. The free-form prism-lens of claim 1, wherein the prism-lens is composed of either poly methyl methacrylate or a cyclic olefin polymer.

17. The free-form prism-lens of claim 1, wherein the reflection of light by the second free-form surface towards the third free-form surface is achieved without the application of any reflective coating to the second free-form surface.

18. The free-form prism-lens of claim 1, wherein the second free-form surface is configured to both perform reflection of light incident from the first free-form surface as well as perform refraction of light incident from the third free-form surface.

* * * * *